(12) United States Patent
Ooishi et al.

(10) Patent No.: US 8,807,699 B2
(45) Date of Patent: Aug. 19, 2014

(54) INK COMPOSITION AND METHOD FOR PRODUCING THE SAME, INK SET, AND IMAGE FORMING METHOD

(75) Inventors: Yasufumi Ooishi, Kanagawa (JP); Yuji Kume, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 183 days.

(21) Appl. No.: 13/637,983

(22) PCT Filed: Mar. 10, 2011

(86) PCT No.: PCT/JP2011/056322
§ 371 (c)(1),
(2), (4) Date: Sep. 28, 2012

(87) PCT Pub. No.: WO2011/122356
PCT Pub. Date: Oct. 6, 2011

(65) Prior Publication Data
US 2013/0016156 A1    Jan. 17, 2013

(30) Foreign Application Priority Data

Mar. 30, 2010 (JP) .................................. 2010-79614

(51) Int. Cl.
*C09D 11/10* (2014.01)
*C09D 11/00* (2014.01)

(52) U.S. Cl.
CPC ................ *C09D 11/40* (2013.01); *C09D 11/54* (2013.01); *C09D 11/101* (2013.01); *C09D 11/322* (2013.01)
USPC .............................................. 347/21; 524/88

(58) Field of Classification Search
CPC ...... C09D 11/54; C09D 11/101; C09D 11/40; C09D 11/322
USPC ....................................................... 347/21
See application file for complete search history.

(56) References Cited

U.S. PATENT DOCUMENTS

| 6,048,667 | A | 4/2000 | Eldin et al. |
| 2005/0012798 | A1 | 1/2005 | Adachi et al. |
| 2009/0291310 | A1 * | 11/2009 | Fields, II et al. .............. 428/407 |
| 2010/0075052 | A1 | 3/2010 | Irita |

FOREIGN PATENT DOCUMENTS

| CN | 1612919 | 5/2005 |
| JP | 10-219158 A | 8/1998 |
| JP | 2000-336295 A | 12/2000 |

OTHER PUBLICATIONS

Partial English language translation of the following: Office action dated Mar. 27, 2014 from the Chinese Patent Office in a Chinese patent application corresponding to the instant patent application. This office action translation is submitted now in order to supplement the understanding of patent document CN1612919A which is cited in the office action and is being disclosed in the instant Information Disclosure Statement.
Office action dated Oct. 27, 2013 from the Chinese Patent Office in a Chinese patent application corresponding to the instant patent application.
International Search Report issued in International Application No. PCT/JP2011/056322 on Mar. 10, 2011.
Written Opinion of the ISA issued in International Application No. PCT/JP2011/056322 on Mar. 10, 2011.

\* cited by examiner

*Primary Examiner* — Doris Lee
(74) *Attorney, Agent, or Firm* — SOLARIS Intellectual Property Group, PLLC

(57) ABSTRACT

An ink composition including: initiator particles including a water-insoluble polymerization initiator and a water-soluble polymer and having a volume average particle diameter of 500 nm or less; a water-soluble polymerizable compound; a pigment; and water.

16 Claims, 1 Drawing Sheet

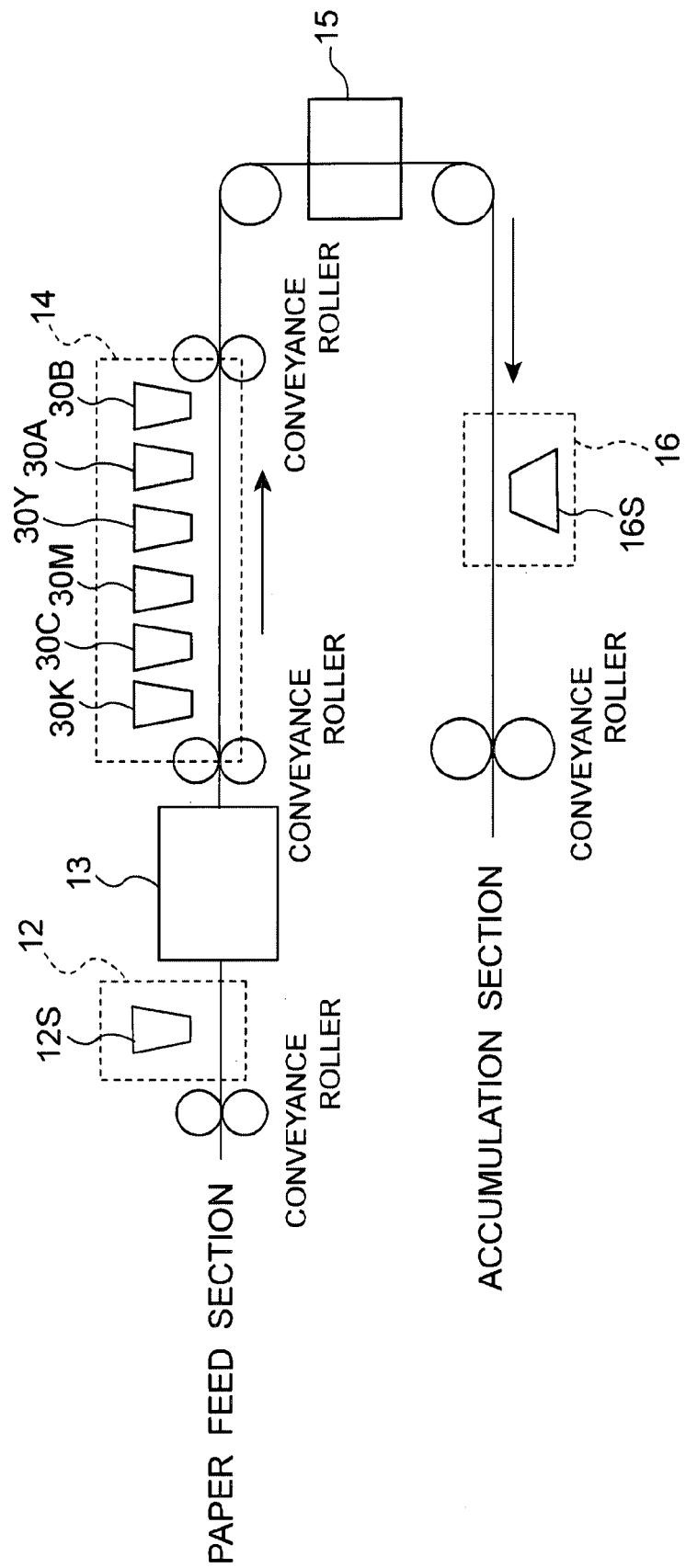

INK COMPOSITION AND METHOD FOR PRODUCING THE SAME, INK SET, AND IMAGE FORMING METHOD

TECHNICAL FIELD

The present invention relates to an ink composition and a method for producing the same, an ink set, and an image forming method.

BACKGROUND ART

As an image recording method that records a color image, there is known an inkjet technique. The inkjet technique has recently been applied to commercial printing fields although it has been applied to fields including office printers and home printers.

As one of the components of an inkjet ink, a pigment is widely used. When a pigment is used, water resistance or light-fastness of the formed image, a jetting property from a jetting head, or the like is an important factor, and consequently various investigations have been performed on techniques to improve these properties. As an invention for improving water resistance and light-fastness of the formed image, for example, there is disclosed an active energy ray curable water-based ink including a polymerizable monomer having a specific structure (for example, see Japanese Patent Application Laid-Open (JP-A) No. 10-219158 and JP-A No. 2000-336295).

However, with regard to the techniques described in JP-A No. 10-219158 and JP-A No. 2000-336295, a jetting property from a jetting head is poor in some cases and further improvement is still required. Further, there is also a need for further improvement in curing sensitivity.

SUMMARY OF INVENTION

The present invention has been made in view of the above situation, and it is an object of the present invention to provide an ink composition having excellent jetting property and curing sensitivity and a method of producing the same, an ink set, and an image forming method.

The present inventors have newly discovered that a jetting property and a curing sensitivity of an ink composition can be improved by introducing a water-insoluble initiator as initiator particles having a particle diameter of 500 nm or less into the ink composition. The present invention has been completed based on these findings.

Exemplary embodiments of the invention are as follows.

<1> An ink composition comprising:
initiator particles comprising a water-insoluble polymerization initiator and a water-soluble polymer and having a volume average particle diameter of 500 nm or less;
a water-soluble polymerizable compound;
a pigment; and
water.

<2> The ink composition according to <1>, wherein the water-soluble polymer is a nonionic water-soluble polymer.

<3> The ink composition according to <2>, wherein the nonionic water-soluble polymer is a block copolymer having a polyoxyethylene structure and a polyoxypropylene structure.

<4> The ink composition according to any one of <1> to <3>, wherein the initiator particles are obtained by mixing an organic solvent solution containing the water-insoluble polymerization initiator with an aqueous solution containing the water-soluble polymer.

<5> The ink composition according to any one of <1> to <4>, wherein the pigment is a water-dispersible pigment wherein at least a portion of the surface of the pigment is coated with a water-insoluble polymer.

<6> An ink set comprising the ink composition of any one of <1> to <5> and a treatment liquid that is capable of forming an aggregate by contact with the ink composition.

<7> The ink set according to <6>, wherein the treatment liquid includes at least one selected from the group consisting of an acidic compound, a polyvalent metal salt, and a cationic polymer.

<8> An image forming method comprising:
applying the ink composition of any one of <1> to <5> onto a recording medium by an inkjet method to form an image; and
applying a treatment liquid that is capable of forming an aggregate by contact with the ink composition onto the recording medium.

<9> The image forming method according to <8>, further comprising irradiating active energy rays to the ink composition applied onto the recording medium.

<10> The image forming method according to <8> or <9>, wherein the recording medium is a coated paper.

<11> The image forming method according to any one of <8> to <10>, wherein the ink composition is applied onto the recording medium onto which the treatment liquid has been applied.

<12> A method for producing an ink composition, comprising:
mixing an organic solvent solution containing a water-insoluble polymerization initiator with an aqueous solution containing a water-soluble polymer to obtain initiator particles containing the water-insoluble polymerization initiator and the water-soluble polymer and having a volume average particle diameter of 500 nm or less; and
mixing the initiator particles, a water-soluble polymerizable compound, a pigment, and water to obtain an ink composition.

According to the present invention, an ink composition having excellent jetting property and curing sensitivity and a method of producing the same, an ink set, and an image forming method can be provided.

BRIEF DESCRIPTION OF DRAWINGS

FIG. 1 is a schematic configuration diagram showing a configuration example of an inkjet recording apparatus used in an image forming method of the present invention.

DESCRIPTION OF EMBODIMENTS

<Ink Composition>

The ink composition of the present invention contains at least one kind of initiator particles including a water-insoluble polymerization initiator and a water-soluble polymer and having a volume average particle diameter of 500 nm or less, at least one water-soluble polymerizable compound, at least one pigment, water, and optionally other components.

By incorporation of the water-insoluble polymerization initiator in the form of initiator particles having a volume average particle diameter of 500 nm or less, an excellent jetting property and a high curing sensitivity can be achieved.

[Initiator Particles]

The ink composition of the present invention contains at least one kind of initiator particles including at least one water-insoluble polymerization initiator and at least one water-soluble polymer and having a volume average particle diameter of 500 nm or less.

The initiator particles have a volume average particle diameter of 500 nm or less. If the volume average particle diameter of the initiator particles is larger than 500 nm, a jetting property is deteriorated or a curing sensitivity is decreased. In the present invention, in view of ink stability in addition to the jetting property and curing sensitivity, the volume average particle diameter of the initiator particles is preferably in the range of 10 nm to 500 nm, more preferably 10 nm to 400 nm, and still more preferably 10 nm to 300 nm.

The particle diameter distribution of the initiator particles in the present invention is not particularly limited and it may be either a wide particle diameter distribution or a monodisperse particle diameter distribution. Further, two or more kinds of initiator particles having a monodisperse particle diameter distribution may be used in admixture.

The average particle diameter and the particle diameter distribution of the initiator particles can be determined by measuring the volume average particle diameter by means of a dynamic light scattering method using a NANOTRACK particle size distribution measuring apparatus UPA-EX150 (trade name, manufactured by Nikkiso Co., Ltd.).

(Water-Insoluble Polymerization Initiator)

The initiator particles include at least one water-insoluble polymerization initiator. The polymerization initiator in accordance with the present invention is not particularly limited as long as it is water-insoluble, and known polymerization initiators may be used. Among them, a radical polymerization initiator is preferable in view of curing sensitivity.

Further, the term "water-insoluble" in the present invention means that the solubility in 100 g of pure water at 25° C. is 3 g or less, preferably 1 g or less.

Examples of the radical polymerization initiator include (a) an aromatic ketone, (b) an acyl phosphine compound, (c) an aromatic onium salt compound, (d) an organic peroxide, (e) a thio compound, (f) a hexaaryl biimidazole compound, (g) a keto oxime ester compound, (h) a borate compound, (i) an azinium compound, (j) a metallocene compound, (k) an active ester compound, (l) a compound having a carbon-halogen bond, and (m) an alkylamine compound.

Specific examples of the initiator include polymerization initiators described in "Kato Kiyomi, Ultraviolet Curing System, pp. 65-148, Sogo Gijutsu Center (1989).

Specific examples of the polymerization initiator include acetophenone, 2,2-diethoxyacetophenone, p-dimethylaminoacetophenone, p-dimethylaminopropiophenone, benzophenone, 2-chlorobenzophenone, p,p'-dichlorobenzophenone, p,p'-bisdiethylaminobenzophenone, Michler's ketone, benzil, benzoin, benzoin methyl ether, benzoin ethyl ether, benzoin isopropyl ether, benzoin n-propyl ether, benzoin isobutyl ether, benzoin n-butyl ether, benzyldimethylketal, tetramethylthiuram monosulfide, thioxanthone, 2-chlorothioxanthone, 2-methylthioxanthone, 2,4-diethylthioxanthone (DETX), 2-isopropylthioxanthone (ITX), azobisisobutyronitrile, benzoin peroxide, di-tert-butylperoxide, 2,2-dimethoxy-1,2-diphenylethan-1-one (trade name: IRGACURE 651), 1-hydroxycyclohexylphenylketone (trade name: IRGACURE 184), 1-[4-(2-hydroxyethoxy)-phenyl]-2-hydroxy-2-methyl-1-propan-1-one (trade name: IRGACURE 2959), 2-hydroxy-2-methyl-1-phenylpropan-1-one (trade name: DAROCUR 1173), 2-hydroxy-1-{4-[4-(2-hydroxy-2-methyl-propionyl)-benzyl]phenyl}-2-methyl-propan-1-one (trade name: IRGACURE 127), 1-(4-isopropylphenyl)-2-hydroxy-2-methylpropan-1-one, 2-methyl-1-(4-methylthiophenyl)-2-morpholinopropan-1-one (trade name: IRGACURE 907), 2-benzyl-2-dimethylamino-1-(4-morpholinophenyl)-butanone-1 (trade name: IRGACURE 369), 2-(dimethylamino)-2-[(4-methylphenyl)methyl]-1-[4-(4-morpholinyl)phenyl]-1-butanone (trade name: IRGACURE 379), 2,4,6-trimethylbenzoyl-diphenyl-phosphine oxide (trade name: DAROCUR TPO), bis(2,4,6-trimethylbenzoyl)-phenylphosphine oxide (trade name: IRGACURE 819), and methylbenzoyl formate. Here, "IRGACURE" and "DAROCUR" are registered trademark of BASF.

Further, other examples of the polymerization initiator include an aromatic diazonium salt, an aromatic halonium salt, an aromatic sulfonium salt, and a metallocene compound, such as triphenylsulfonium hexafluorophosphate or diphenyliodonium hexafluoroantimonate.

The water-insoluble polymerization initiators in accordance with the present invention may be used alone or in a combination of two or more thereof.

In view of the jetting property and curing sensitivity, the water-insoluble polymerization initiator in the present invention is preferably at least one selected from (a) aromatic ketones (for example, benzophenone, 2,4-diethylthioxanthone (DETX), 2-isopropylthioxanthone (ITX), 1-hydroxycyclohexylphenylketone (trade name: IRGACURE 184), 2-hydroxy-1-{4-[4-(2-hydroxy-2-methyl-propionyl)-benzyl]phenyl}-2-methyl-propan-1-one (trade name: IRGACURE 127), 2-methyl-1-(4-methylthiophenyl)-2-morpholinopropan-1-one (trade name: IRGACURE 907), and 2-benzyl-2-dimethylamino-1-(4-morpholinophenyl)-butanone-1 (trade name: IRGACURE 369)), and, (b) acyl phosphine compounds (for example, 2,4,6-trimethylbenzoyl-diphenyl-phosphine oxide (trade name: DAROCUR TPO), and bis(2,4,6-trimethylbenzoyl)-phenylphosphine oxide (trade name: IRGACURE 819)), and more preferably at least one selected from (a) aromatic ketones (for example, 2-methyl-1-(4-methylthio phenyl)-2-morpholinopropan-1-one (trade name: IRGACURE 907), and 2-benzyl-2-dimethylamino-1-(4-morpholinophenyl)-butanone-1 (trade name: IRGACURE 369)).

(Water-Soluble Polymer)

The initiator particles include at least one water-soluble polymer. The water-soluble polymer is not particularly limited as long as it is a polymer compound that is capable of dispersing the water-insoluble initiator in an aqueous solvent and has a solubility of 3 g or more in 100 g of pure water at 25° C., and the solubility is preferably 5 g or more.

The water-soluble polymer may be any one of a nonionic polymer, an anionic polymer, a cationic polymer and a betaine polymer. In view of ink stability and the jetting property, a nonionic polymer or an anionic polymer is preferable, and a nonionic polymer is more preferable.

In view of the jetting property and curing sensitivity, the nonionic polymer is preferably a polymer having a polyoxyalkylene structure, more preferably a polymer having a polyoxyalkylene structure containing an alkylene chain having 2 to 10 carbon atom, still more preferably a copolymer having an oxyethylene group and an oxypropylene group, and particularly preferably a block copolymer having a polyoxyethylene structure and a polyoxypropylene structure.

In view of the jetting property and curing sensitivity, a molecular weight of the water-soluble polymer is preferably in the range of 1,000 to 50,000 in terms of a weight average molecular weight, and more preferably 2,000 to 30,000.

The weight average molecular weight of the water-soluble polymer is measured by a general method using GPC.

In view of the jetting property and curing sensitivity, the water-soluble polymer in accordance with the present invention is preferably a nonionic polymer having a polyoxyalkylene structure containing an alkylene chain having 2 to 10 carbon atoms and having a weight average molecular weight of 1,000 to 50,000, and more preferably a block copolymer having a polyoxyethylene structure and a polyoxypropylene structure and a weight average molecular weight of 2,000 to 30,000.

The water-soluble polymers in accordance with the present invention may be used alone or in a combination of two or more thereof.

In view of the jetting property and curing sensitivity, the content ratio of the water-soluble polymer to the water-insoluble polymerization initiator included in the initiator particles (water-soluble polymer/water-insoluble polymerization initiator) is preferably in the range of 0.1 to 3.0, and more preferably 0.15 to 2.5.

(Method for Producing Initiator Particles)

The method for producing initiator particles in accordance with the present invention is not particularly limited, as long as it is ensured that the volume average particle diameter of initiator particles including a water-insoluble polymerization initiator and a water-soluble polymer is 500 nm or less.

For example, initiator particles can be produced by treating a mixture including the water-insoluble polymerization initiator and the water-soluble polymer using a conventionally used emulsification/dispersion method. Specifically, initiator particles can be produced by subjecting a mixture including the water-insoluble polymerization initiator and the water-soluble polymer to a kneading dispersion treatment, using a double roll mill, a triple roll mill, a ball mill, a Tron mill, a Disper, a kneader, a co-kneader, a homogenizer, a blender, or a single-screw or twin-screw extruder while applying strong shear force.

In addition, the details of the kneading and dispersion are described in T. C. Patton, "Paint Flow and Pigment Dispersion" (1964, published by John Wiley and Sons, Inc.), and the like.

Optionally, initiator particles can be produced by performing a fine dispersion treatment with beads having a particle diameter of 0.01 mm to 1 mm and formed of glass, zirconia or the like, using a vertical type or horizontal type sand grinder, a pin mill, a slit mill, an ultrasonic disperser or the like.

In view of the jetting property, curing sensitivity and ink stability, the initiator particles are preferably produced by a production method including a step of mixing an organic solvent solution containing the water-insoluble polymerization initiator and an organic solvent with an aqueous solution containing the water-soluble polymer and water to obtain an emulsion/dispersion of initiator particles, and optionally other steps.

An example of the method of mixing the organic solvent solution with the aqueous solution includes the same method as in the kneading dispersion treatment as already described above. Among them, in view of the jetting property and curing sensitivity, the mixing step is preferably carried out with high speed stirring at a stirring speed of 5,000 rpm or more, more preferably 6,000 rpm or more, and still more preferably 7,000 rpm or more. The upper limit of the stirring speed is not particularly limited and may be set to, for example, 50,000 rpm.

The stirring time may be, for example, in the range of 1 minute to 60 minutes, more preferably 2 minutes to 45 minutes, and still more preferably 3 minutes to 30 minutes.

In the present invention, in view of the jetting property and curing sensitivity, the mixing step is preferably carried out with high speed stirring under conditions of a stirring speed of 5,000 rpm or more for 1 minute to 60 minutes, more preferably 6,000 rpm or more for 2 minutes to 45 minutes, and still more preferably 7,000 rpm or more for 3 minutes to 30 minutes.

Although the high speed stirring may be carried out continuously or intermittently, an emulsion/dispersion of initiator particles can be more efficiently produced by intermittent mixing.

Although the temperature conditions for high speed stirring are not particularly limited, the temperature of a liquid is preferably in the range of 10° C. to 70° C., more preferably 15° C. to 55° C., and still more preferably 20° C. to 40° C.

The stirring apparatus is preferably an apparatus capable of applying strong shear force, and for example, CLEARMIX (trade name, M Technique Co., Ltd.) can be appropriately used.

The organic solvent solution contains at least one water-insoluble polymerization initiator and at least one organic solvent and may contain optionally other components.

The water-insoluble polymerization initiator is as described above, and a preferable embodiment thereof is also the same.

The organic solvent is not particularly limited as long as it is capable of dissolving a water-insoluble polymerization initiator, and may be appropriately selected depending on the water-insoluble polymerization initiator. In the present invention, in view of the jetting property, curing sensitivity and ink stability, examples of the organic solvent include an alcohol solvent, a ketone solvent, an ester solvent, and an ether solvent.

Examples of the alcohol solvent include ethanol, isopropanol, n-butanol, tertiary butanol, isobutanol, and diacetone alcohol. Examples of the ketone solvent include acetone, methyl ethyl ketone, diethyl ketone, and methyl isobutyl ketone. Examples of the ester solvent include ethyl acetate and butyl acetate. Examples of the ether solvent include dibutyl ether, tetrahydrofuran, and dioxane. Among these organic solvents, an alcohol solvent and a ketone solvent are preferable, isopropanol, acetone and methyl ethyl ketone are more preferable, and methylethylketone is particularly preferable. These organic solvents may be used alone or in a combination of several types.

The content of the water-insoluble polymerization initiator in the organic solvent solution is not particularly limited and may be appropriately selected depending on the kinds of organic solvent and water-insoluble polymerization initiator. Among them, the content ratio of the water-insoluble polymerization initiator with respect to the organic solvent is preferably in the range of 3% by mass to 20% by mass and more preferably 5% by mass to 15% by mass, in view of the jetting property, curing sensitivity and manufacturability.

The aqueous solution contains at least one water-soluble polymer and water and may contain optionally other components.

The water-soluble polymer is as described above, and a preferable embodiment thereof is also the same.

The content of the water-soluble polymer in the aqueous solution is not particularly limited, and may be appropriately selected depending on the kind of water-soluble polymer.

Among them, the content ratio of the water-soluble polymer with respect to water is preferably in the range of 0.5% by mass to 10% by mass and more preferably 1.0% by mass to 5.0% by mass, in view of the jetting property, curing sensitivity and manufacturability.

Although the mixing ratio of the organic solvent solution and the aqueous solution may be appropriately selected depending on the content of a water-insoluble polymerization initiator in an organic solvent solution, the content of a water-soluble polymer in an aqueous solution, and the like, it is preferable that the content ratio of the water-soluble polymer to the water-insoluble polymerization initiator (water-soluble polymer/water-insoluble polymerization initiator) is within the above-specified preferable range.

The method for producing initiator particles in accordance with the present invention preferably further includes a step of removing at least a portion of the organic solvent from the emulsion/dispersion of initiator particles, as other steps described above.

The removal of the organic solvent in the initiator particle production method is not particularly limited, and the solvent can be removed by a known method such as distillation under reduced pressure.

In the present invention, in view of ink stability and the jetting property, the content of the organic solvent in the emulsion/dispersion of initiator particles is preferably 3.0% by mass or less, and more preferably 1.0% by mass or less.

The initiator particles in the initiator particle dispersion/emulsion thus obtained maintain a good dispersed state, and the obtained initiator particle dispersion/emulsion has excellent stability over time.

Since the initiator particles are present in a state with a particle diameter of 500 nm or less, it is believed that a jetting property and a curing sensitivity are improved due to excellent storage stability and fine and homogeneous emulsification/dispersion of the initiator particles, when the initiator particles are used in an ink composition.

The content of initiator particles in the dispersion/emulsion is preferably in the range of 0.1% by mass to 30% by mass, more preferably 0.5% by mass to 25% by mass, and most preferably 1.0% by mass to 20% by mass, with respect to the total mass of the dispersion/emulsion.

The initiator particles in accordance with the present invention may be used alone or in a combination of two or more thereof.

[Water-Soluble Polymerizable Compound]

The ink composition in accordance with the present invention contains at least one water-soluble polymerizable compound having a polymerizable group and is polymerized by irradiation of active energy rays. Polymerization of this polymerizable compound is initiated by the initiator particles, and the polymerizable compound is capable of strengthening an image through polymerization and curing after being interposed between the pigment particles when the pigment to be described below aggregates by contact with a treatment liquid.

The term "water-soluble" as used herein refers to capability of being dissolved in water at at least a certain concentration, and it may be any one as long as it is capable of (preferably homogeneously) dissolved in a water-based ink composition. Further, the water-soluble polymerizable compound may be (preferably homogeneously) dissolved in an ink due to an increase in solubility by the addition of a water-soluble organic solvent to be described below. Specifically, solubility (25° C.) in water of 10% by mass or more is preferable, and 15% by mass or more is more preferable.

The water-soluble polymerizable compound is preferably a nonionic or cationic polymerizable compound in view of not interfering with the reaction between an aggregating agent to be described below and the pigment. A polymerizable compound having water solubility of 10% by mass or more (further, 15% by mass or more) is preferable.

Examples of the nonionic polymerizable monomer include polymerizable compounds such as (meth)acrylic monomers.

Examples of the (meth)acrylic monomer include ultraviolet-curable monomers and oligomers such as a (meth)acrylic acid ester of a polyhydric alcohol, a (meth)acrylic acid ester of glycidyl ether of a polyhydric alcohol, a (meth)acrylic acid ester of polyethylene glycol, a (meth)acrylic acid ester of an ethylene oxide adduct compound of a polyhydric alcohol, and a reaction product between a polybasic acid anhydride and a hydroxyl group-containing (meth)acrylic acid ester.

The polyhydric alcohol may also be one that is internally chain-extended with an ethylene oxide chain by the addition of ethylene oxide.

Hereinafter, specific examples of the nonionic polymerizable compound (nonionic compounds 1 to 6) are illustrated. However, the present invention is not limited thereto.

Nonionic compound 1

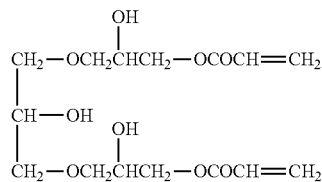

Nonionic compound 2

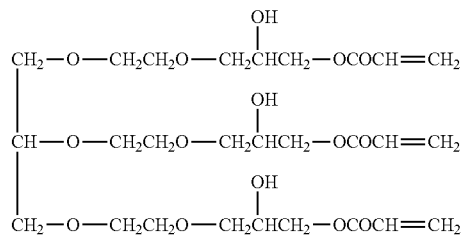

Nonionic compound 3

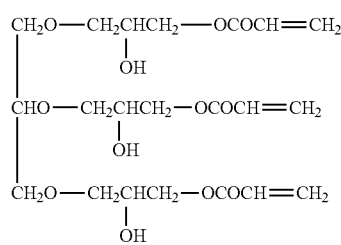

Nonionic compound 4

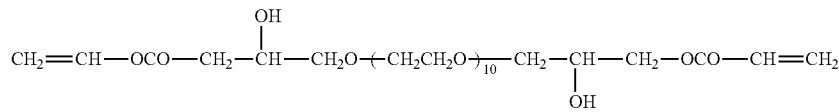

-continued

Nonionic compound 5

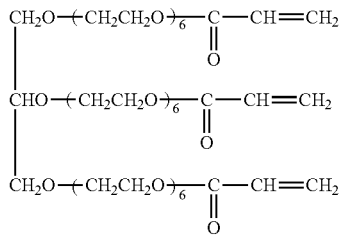

Nonionic compound 6

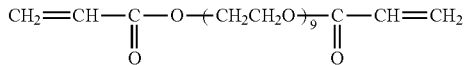

Further, an acrylic acid ester may also be used which has two or more acryloyl groups in one molecule and is derived from a polyhydroxy compound. Examples of the polyhydroxy compound include condensates of glycols, oligo ethers, and oligo esters.

Further, a (meth)acrylic acid ester of a polyol having two or more hydroxyl groups, such as a monosaccharide or disaccharide; or a (meth)acrylic acid ester with a triethanol amine, a diethanol amine, trishydroxy aminomethane, trishydroxyaminoethane or the like is also preferable as the nonionic polymerizable compound.

Further, a water-soluble polymerizable compound having an acrylamide structure in the molecule is also preferable as the nonionic polymerizable compound.

Here, the polymerizable compound having an acrylamide structure in the molecule is preferably a compound represented by the following formula (1).

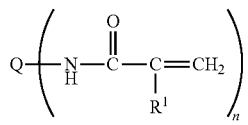

Formula 1

In the formula (1), Q represents an n-valent linking group, $R^1$ represents a hydrogen atom or a methyl group, and n represents an integer of 1 or more.

The compound represented by the formula (1) is a compound wherein an unsaturated vinyl monomer is bonded to a linking group Q via an amide bond. $R^1$ represents a hydrogen atom or a methyl group, preferably a hydrogen atom. Although there is no limitation on a valence n of a linking group Q, n is preferably 2 or more, more preferably from 2 to 6, and still more preferably from 2 to 4, in view of improving polymerization efficiency and the jetting property.

The linking group Q is not particularly limited as long as it is a group that is linkable to a (meth)acrylamide structure, and is preferably selected so that the compound represented by the formula (1) satisfies the water-solubility as described above. Specific examples of the linking group Q include residues obtained by removing one or more hydrogen atoms or hydroxyl groups from the compound selected from the following compound group X.

—Compound Group X—

Polyols such as ethylene glycol, diethylene glycol, triethylene glycol, polyethylene glycol, propylene glycol, dipropylene glycol, tripropylene glycol, polypropylene glycol, 1,3-propanediol, 1,2-butanediol, 1,3-butanediol, 1,4-butanediol, 2,3-butanediol, 1,5-pentanediol, 1,4-pentanediol, 2,4-pentanediol, 3-methyl-1,5-pentanediol, 2-methyl-2,4-pentanediol, 1,5-hexanediol, 1,6-hexanediol, 2,5-hexanediol, glycerin, 1,2,4-butanetriol, 1,2,6-hexanetriol, 1,2,5-pentanetriol, thio glycol, trimethylol propane, ditrimethylol propane, trimethylol ethane, ditrimethylol ethane, neopentyl glycol, pentaerythritol, dipentaerythritol, and condensates thereof, low-molecular weight polyvinyl alcohols, and saccharides; and polyamines such as ethylene diamine, diethylene triamine, triethylene tetramine, polyethylene imine, and polypropylene diamine.

Further, other examples include a substituted or unsubstituted alkylene chain having 4 or fewer carbon atoms, such as methylene, ethylene, propylene or butylene group, and further functional groups having a saturated or unsaturated heterocyclic ring such as a pyridine ring, an imidazole ring, a pyrazine ring, a piperidine ring, a piperazine ring or a morpholine ring.

Among them, the linking group Q is preferably a residue of polyols containing an oxyalkylene group (preferably, an oxyethylene group), and particularly preferably a residue of polyols containing three or more oxyalkylene groups (preferably, oxyethylene groups).

Hereinafter, specific examples of the compound represented by the formula (1) (polymerizable compounds 1 to 41) are illustrated. However, the present invention is not limited thereto.

Polymerizable compound 1

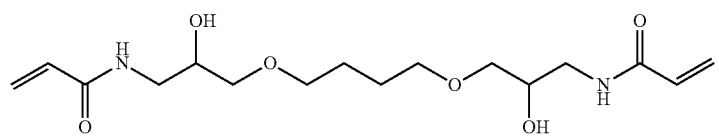

Polymerizable compound 2

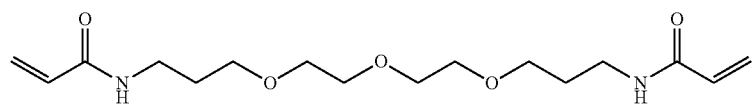

-continued
Polymerizable compound 3
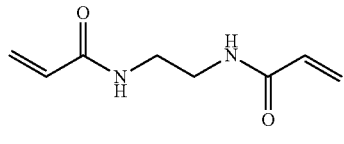
Polymerizable compound 4
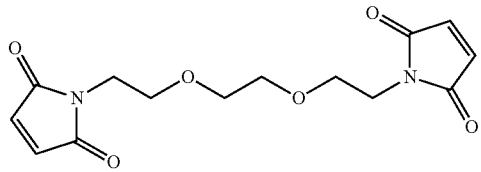
Polymerizable compound 5
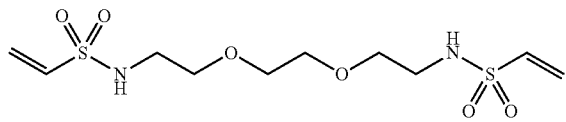
Polymerizable compound 6
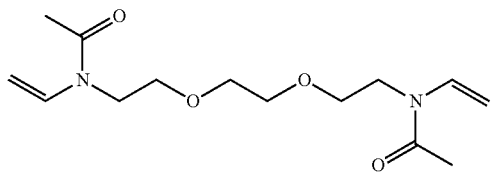
Polymerizable compound 7
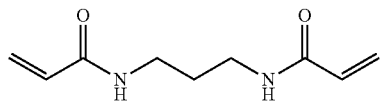
Polymerizable compound 8
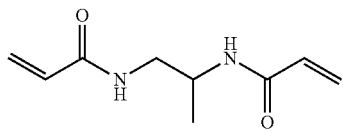
Polymerizable compound 9
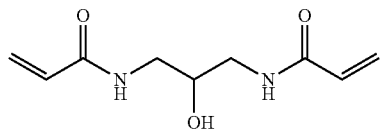
Polymerizable compound 10
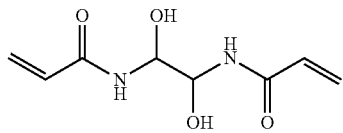
Polymerizable compound 11
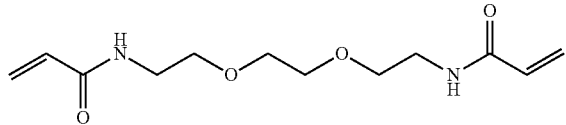
Polymerizable compound 12
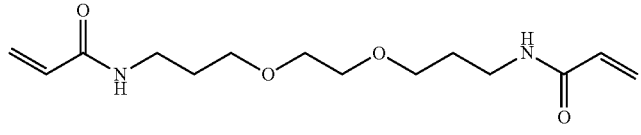
Polymerizable compound 13
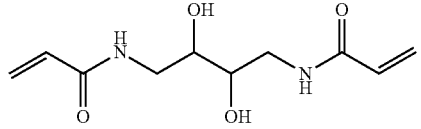
Polymerizable compound 14
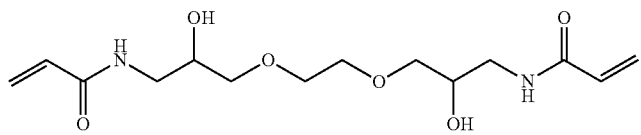
Polymerizable compound 15
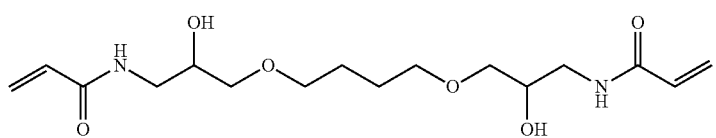

-continued
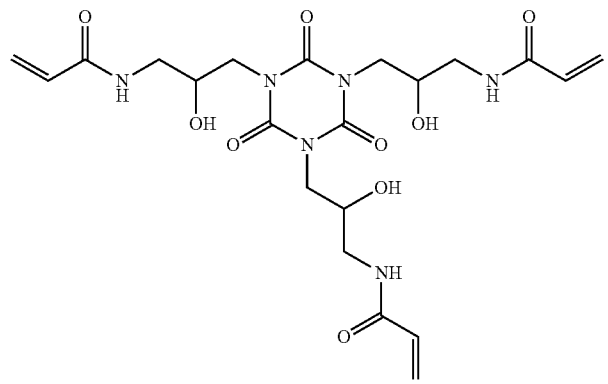
Polymerizable compound 16
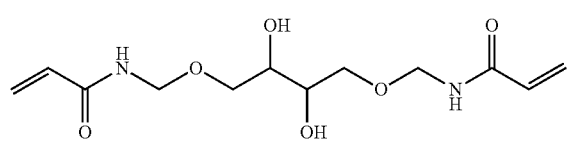
Polymerizable compound 17
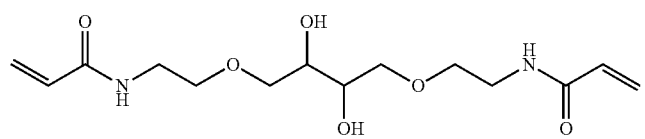
Polymerizable compound 18
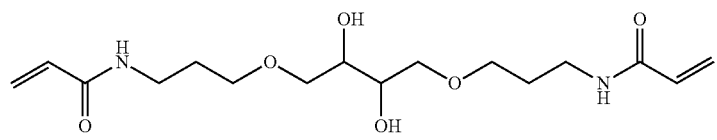
Polymerizable compound 19
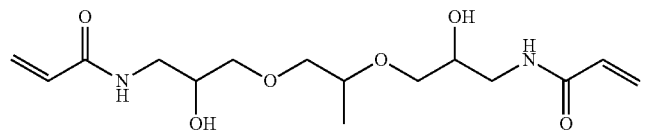
Polymerizable compound 20
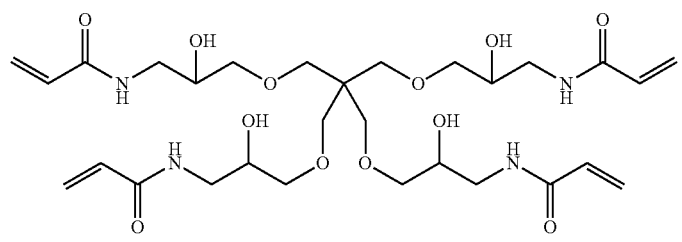
Polymerizable compound 21
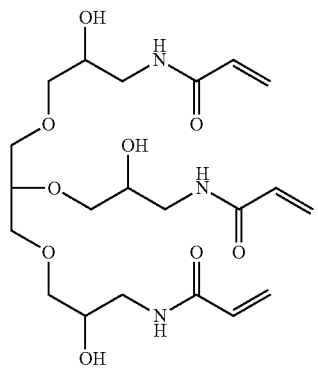
Polymerizable compound 22

-continued
Polymerizable compound 23
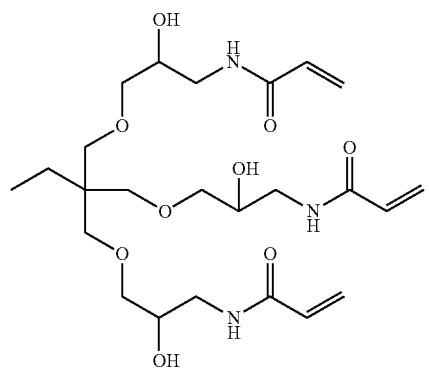
Polymerizable compound 24
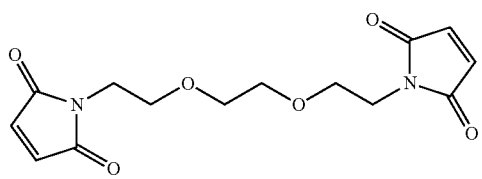
Polymerizable compound 25
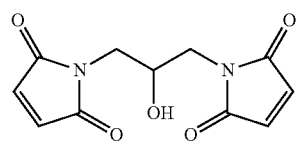
Polymerizable compound 26
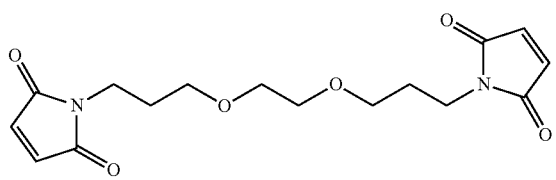
Polymerizable compound 27
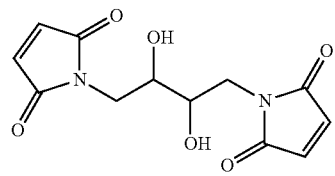
Polymerizable compound 28
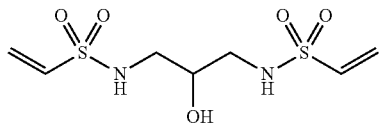
Polymerizable compound 29
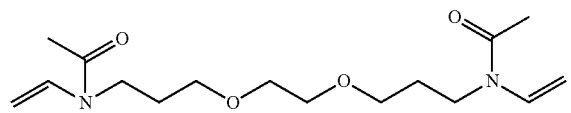
Polymerizable compound 30
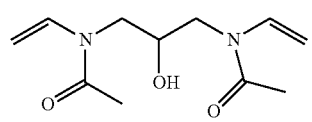
Polymerizable compound 31
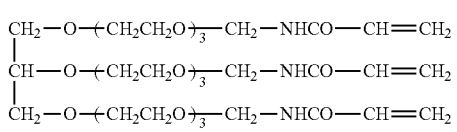
Polymerizable compound 32
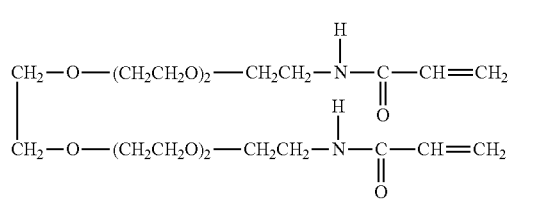
Polymerizable compound 33
Polymerizable compound 34
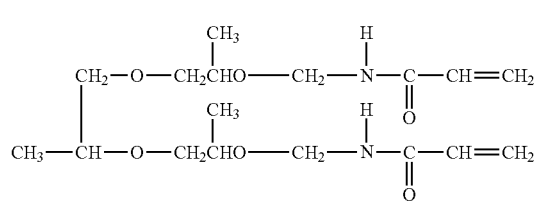

-continued
Polymerizable compound 35
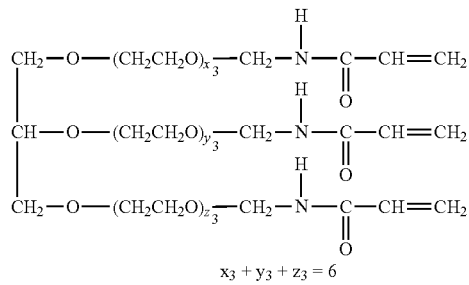
$x_3 + y_3 + z_3 = 6$
Polymerizable compound 36
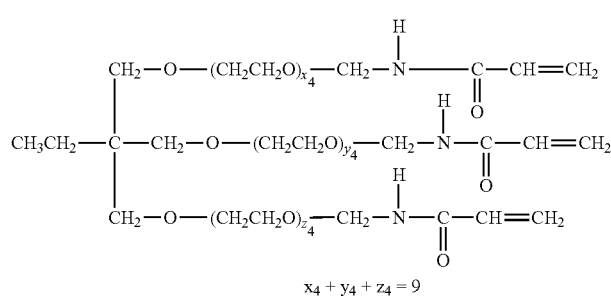
$x_4 + y_4 + z_4 = 9$
Polymerizable compound 37
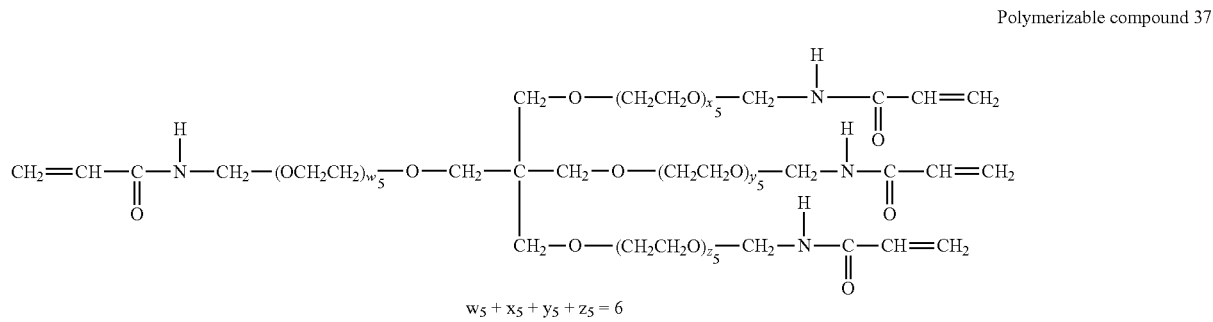
$w_5 + x_5 + y_5 + z_5 = 6$
Polymerizable compound 38
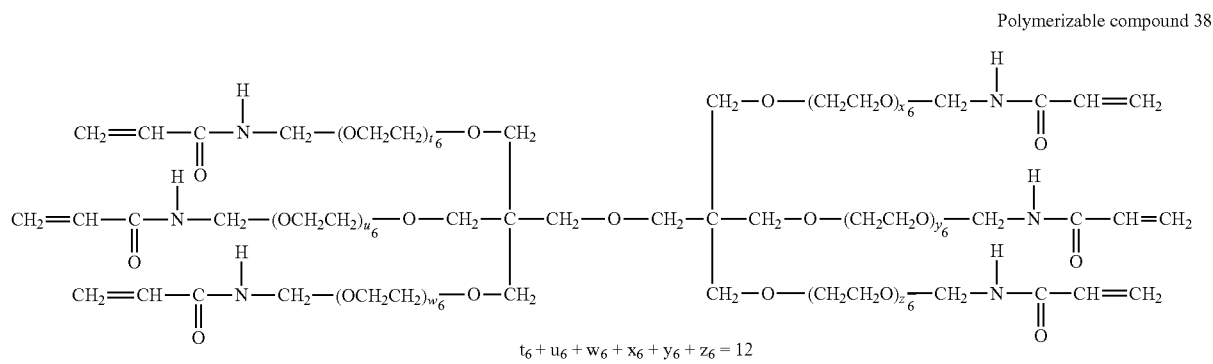
$t_6 + u_6 + w_6 + x_6 + y_6 + z_6 = 12$
Polymerizable compound 39
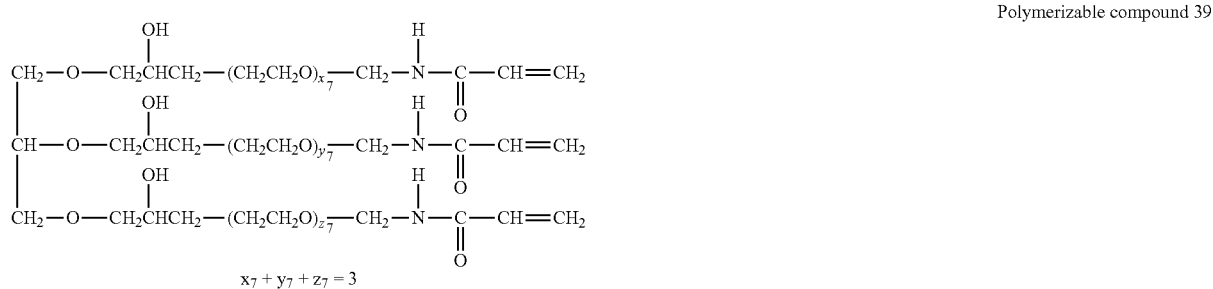
$x_7 + y_7 + z_7 = 3$ -continued Polymerizable compound 40

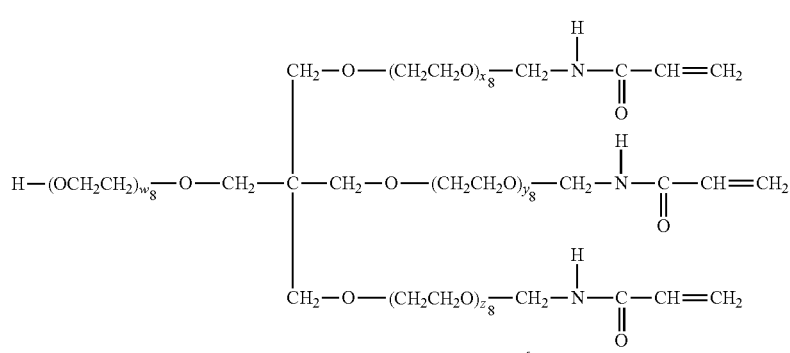

$w_8 + x_8 + y_8 + z_8 = 6$

Polymerizable compound 41

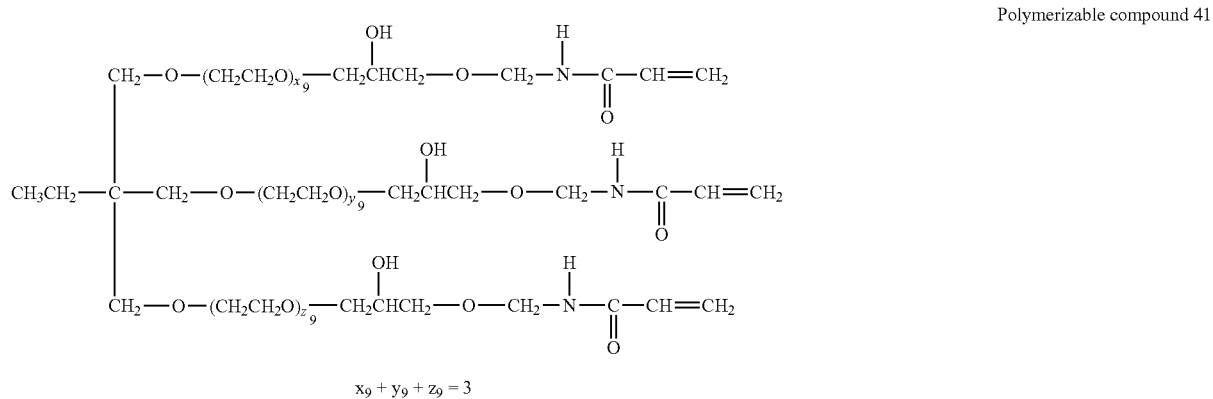

$x_9 + y_9 + z_9 = 3$

The cationic polymerizable compound is a compound having a cation group and a polymerizable group such as an unsaturated double bond. For example, epoxy monomers, oxetane monomers and the like may be preferably used. If the cationic polymerizable compound is incorporated, cationic property of an ink composition is enhanced due to having a cation group, and mixing of colors is more effectively prevented when an anionic ink is used.

Examples of the cationic polymerizable compound include N,N-dimethylaminoethyl methacrylate, N,N-dimethylaminoethyl acrylate, N,N-dimethylaminopropyl methacrylate, N,N-dimethylaminopropyl acrylate, N,N-dimethylaminoacrylamide, N,N-dimethylamino methacrylamide, N,N-dimethylaminoethyl acrylamide, N,N-dimethylaminoethyl methacrylamide, N,N-dimethylaminopropyl acrylamide, N,N-dimethylaminopropyl methacrylamide, and quaternized compounds thereof.

Examples of epoxy monomers include glycidyl ethers or glycidyl esters of polyhydric alcohols, and alicyclic epoxides.

Examples of the cationic polymerizable compound include those having the following structure.

Structure 1

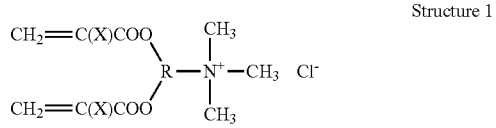

Structure 2

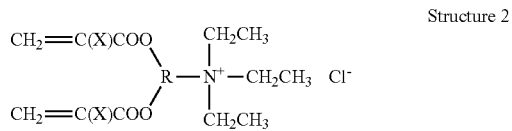

Structure 3

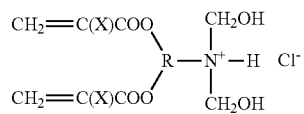

Structure 4

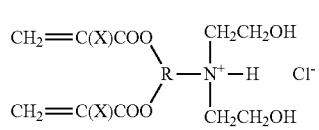

Structure 5

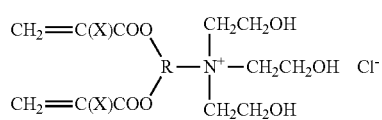

Structure 6

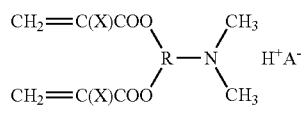

Structure 7

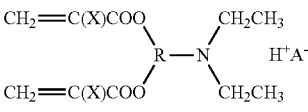

Structure 8

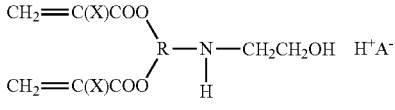

Structure 9
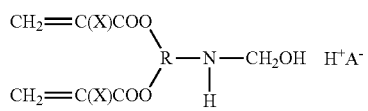

Structure 10
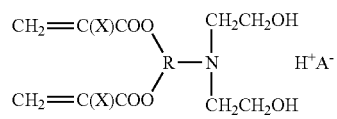

Structure 11
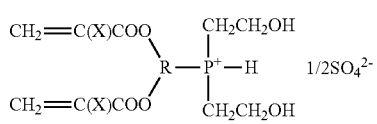

Structure 12
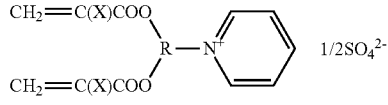

In the above-stated structures, R represents a residue of polyol, X represents H or $CH_3$, and $A^-$ represents $Cl^-$, $HSO_3^-$ or $CH_3COO^-$. Examples of the compound for introducing this polyol include glycerin, 1,2,4-butanetriol, 1,2,5-pentanetriol, 1,2,6-hexanetriol, trimethylolpropane, trimethylolmethane, trimethylolethane, pentaerythritol, bisphenol A, alicyclic bisphenol A and condensates thereof.

Hereinafter, specific examples of the polymerizable compound having a cation group (cationic compounds 1 to 11) are illustrated. However, the present invention is not limited thereto.

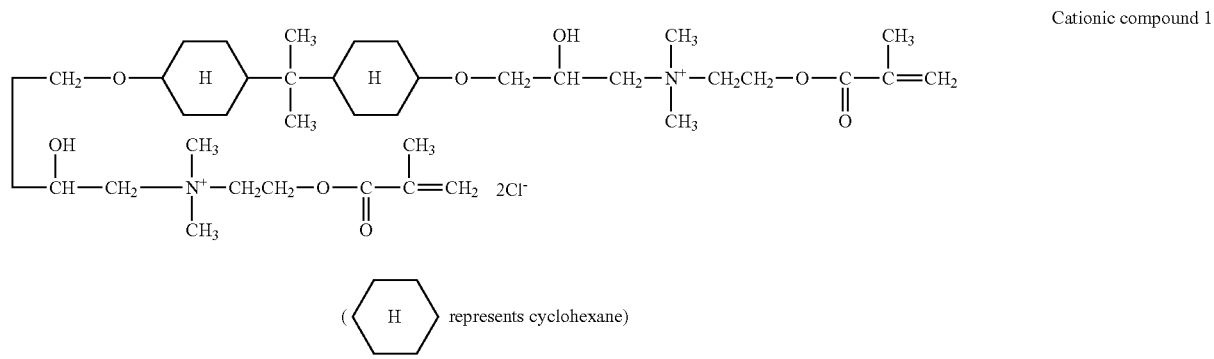

Cationic compound 1

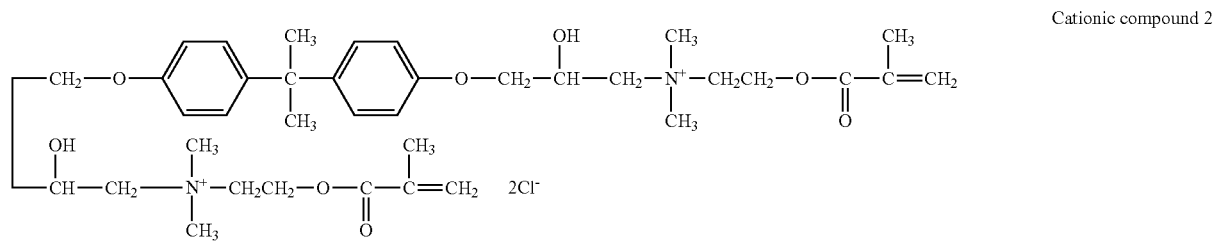

Cationic compound 2

Cationic compound 3

Cationic compound 4
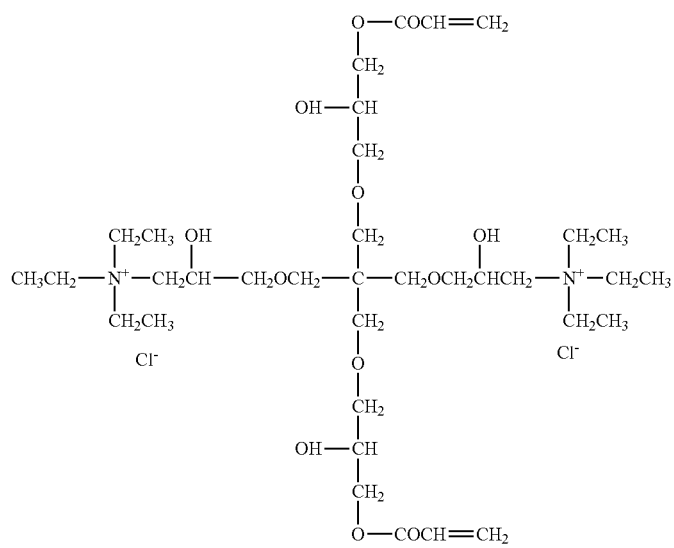
Cationic compound 5
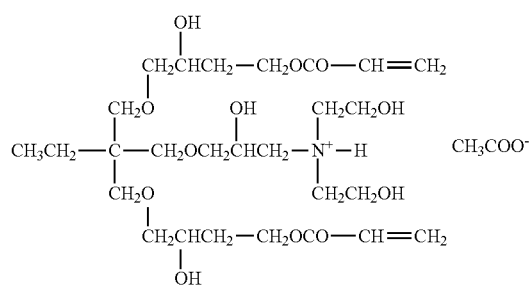
Cationic compound 6
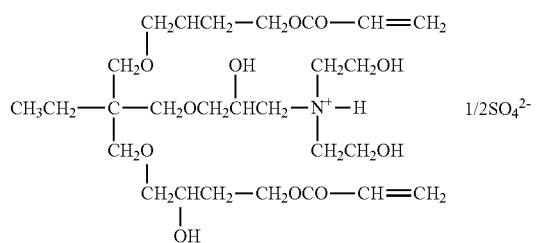
Cationic compound 7
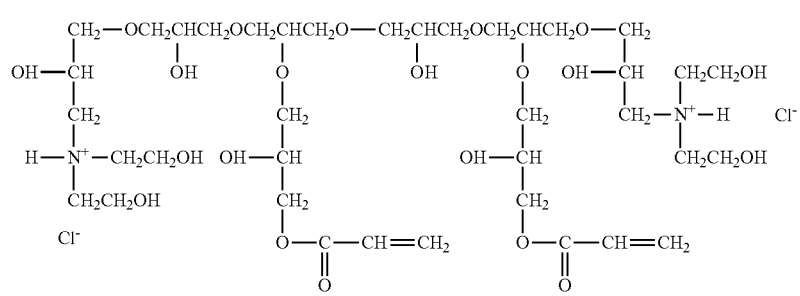
Cationic compound 8
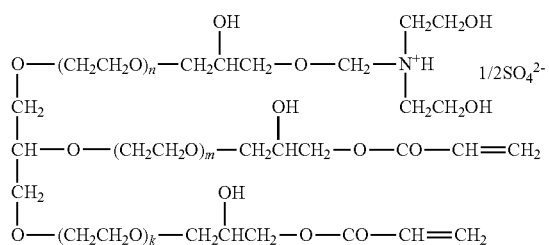
n + m + k = 15
Cationic compound 9
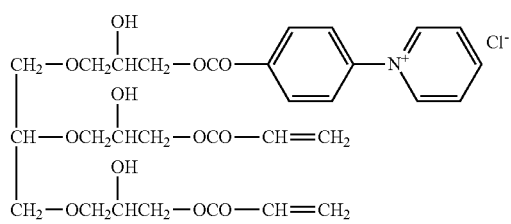

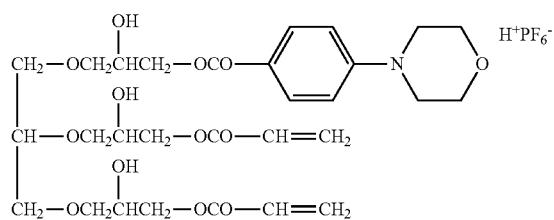

Cationic compound 10

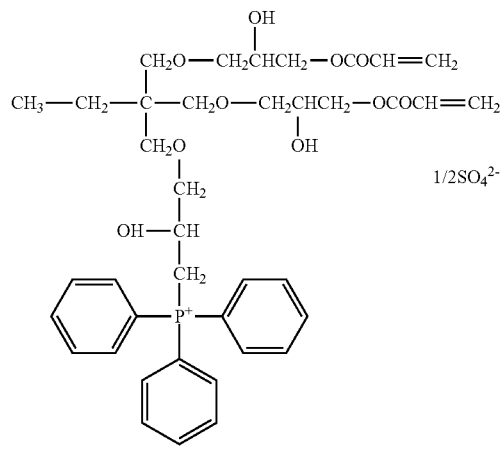

Cationic compound 11

The water-soluble polymerizable compound in accordance with the present invention is preferably a polyfunctional monomer, more preferably a difunctional to hexafunctional monomer, in view of enhancing scratch resistance. In view of compatibility between solubility and scratch resistance, a difunctional to tetrafunctional monomer is preferable.

The water-soluble polymerizable compounds may be used alone or in a combination of two or more thereof.

The content of the water-soluble polymerizable compound in the ink composition is preferably in the range of 5% by mass to 50% by mass, more preferably 10% by mass to 30% by mass, and particularly preferably 15% by mass to 25% by mass, with respect to the total mass of the ink composition.

The content ratio of the water-soluble polymerizable compound is preferably in the range of 200% by mass to 1000% by mass, and more preferably 250% by mass to 1000% by mass, with respect to the solid content of the pigment. If the content ratio of the polymerizable compound is 200% by mass or more, image strength is further improved to result in excellent scratch resistance of the image. If the content ratio of the polymerizable compound is 1000% by mass or less, it is advantageous in terms of pile height.

[Pigment]

The ink composition in accordance with the present invention contains at least one pigment. The pigment is not particularly limited and may be appropriately selected depending on the purpose. For example, the pigment may be any of an organic pigment and an inorganic pigment. It is preferable in view of ink colorability that the pigment is virtually insoluble or poorly soluble in water.

The pigment in accordance with the present invention is not particularly limited in the type thereof, and conventional known organic and inorganic pigments can be can be used.

Examples of the organic pigment include an azo pigment, a polycyclic pigment, a dye chelate, a nitro pigment, a nitroso pigment, and aniline black. Among them, an azo pigment, a polycyclic pigment and the like are more preferable.

Examples of the azo pigment include an azo lake, an insoluble azo pigment, a condensed azo pigment, and a chelate azo pigment. Examples of the polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, and a quinophthalone pigment. Examples of the dye chelate include a basic dye type chelate and an acidic dye type chelate.

Examples of the inorganic pigment include titanium oxide, iron oxide, calcium carbonate, barium sulfate, aluminum hydroxide, barium yellow, cadmium red, chrome yellow, and carbon black. Among them, carbon black is particularly preferable. In this regard, the carbon black may be produced by a known method such as a contact method, a furnace method or a thermal method.

Specific examples of the pigment that can be used in the present invention include the pigments described in the paragraphs [0142] to [0145] of JP-A No. 2007-100071.

The pigments may be used alone or in a combination of several types selected from within the individual groups or between the individual groups.

In view of color density, granularity, ink stability and jetting reliability, the content of the pigment in the ink composition is preferably in the range of 1% by mass to 25% by mass, and more preferably 5% by mass to 20% by mass, with respect to the total mass of the ink composition.

(Dispersant)

The pigment preferably constitutes coloring particles dispersed in an aqueous solvent by a dispersant. The dispersant may be a polymer dispersant or a low-molecular weight surfactant type dispersant. Further, the polymer dispersant may be any of a water-soluble polymer dispersant and a water-insoluble polymer dispersant.

The dispersant in accordance with the present invention is preferably a water-insoluble polymer dispersant, in view of dispersion stability, and the jetting property when applied to an inkjet method.

—Water-Insoluble Polymer Dispersant—

The water-insoluble polymer dispersant (hereinafter, may be simply referred to as "dispersant") in accordance with the present invention is not particularly limited as long as it is a water-insoluble polymer and is capable of dispersing a pigment, and conventionally known water-insoluble polymer dispersants can be used. For example, the water-insoluble polymer dispersant can be constituted to include both a hydrophobic constituent unit and a hydrophilic constituent unit.

Examples of the monomer constituting the hydrophobic constituent unit include a styrene-type monomer, an alkyl (meth)acrylate, and an aromatic group-containing (meth)acrylate.

The monomer constituting the hydrophilic constituent unit is not particularly limited as long as it is a monomer containing a hydrophilic group. Examples of the hydrophilic group include a nonionic group, a carboxy group, a sulfonic acid group, and a phosphoric acid group. Examples of the nonionic group include a hydroxyl group, an amide group (wherein a nitrogen atom is unsubstituted), a group derived from an alkylene oxide polymer (for example, polyethylene oxide or polypropylene oxide), and a group derived from a sugar alcohol.

The hydrophilic constituent unit in accordance with the present invention preferably contains at least a carboxy group in view of dispersion stability, and a form containing both a nonionic group and a carboxy group is also preferable.

Specific examples of the water-insoluble polymer dispersant in accordance with the present invention include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol (meth)acrylate-(meth)acrylic acid copolymer, and a styrene-maleic acid copolymer.

Here, the term "(meth)acrylic acid" means acrylic acid or methacrylic acid.

The water-insoluble polymer dispersant in accordance with the present invention is preferably a vinyl polymer containing a carboxy group, and more preferably a vinyl polymer having at least a constituent unit derived from an aromatic group-containing monomer as the hydrophobic constituent unit, and a constituent unit containing a carboxy group as the hydrophilic constituent unit, in view of the dispersion stability of the pigment.

The weight average molecular weight of the water-insoluble polymer dispersant is preferably in the range of 3,000 to 200,000, more preferably 5,000 to 100,000, still more preferably 5,000 to 80,000, and particularly preferably from 10,000 to 60,000, in view of the dispersion stability of the pigment.

The acid value of the water-insoluble polymer dispersant is preferably 200 mgKOH/g or less, in view of a good aggregation property when a treatment liquid is brought into contact. Further, the acid value is more preferably 25 mgKOH/g to 180 mgKOH/g, still more preferably 25 mgKOH/g to 150 mgKOH/g, and particularly preferably 30 mgKOH/g to 130 mgKOH/g. If the acid value of the polymer dispersant is 200 mgKOH/g or less, further 150 mgKOH/g or less, the pigment becomes relatively hydrophobic, so that water resistance of the image becomes favorable. If the acid value of the polymer dispersant is 25 mgKOH/g or more, the stability of self dispersibility becomes favorable.

In view of self dispersibility and an aggregation rate when a treatment liquid is brought into contact, the water-insoluble polymer dispersant preferably contains a polymer having a carboxy group, more preferably a polymer having a carboxy group and an acid value of 25 mgKOH/g to 150 mgKOH/g, and still more preferably a polymer having a carboxy group and an acid value of 30 mgKOH/g to 130 mgKOH/g.

The content of the dispersant in the coloring particles in accordance with the present invention is preferably in the range of 10% by mass to 100% by mass, more preferably 20% by mass to 70% by mass, and particularly preferably 30% by mass to 60% by mass, with respect to the content of the pigment, in view of dispersibility of the pigment, ink colorability and dispersion stability.

When the content of the dispersant in the coloring particles is in the above-specified range, the pigment is coated with an appropriate amount of the dispersant, and thus there is a tendency that coloring particles having a small particle diameter and excellent stability over time are easily obtained, which is thus preferable.

The coloring particles in accordance with the present invention may contain another dispersant, in addition to the water-insoluble polymer dispersant. For example, a conventionally known water-soluble low-molecular weight dispersant or water-soluble polymer or the like can be used. The content of the dispersant other than the water-insoluble polymer dispersant can be within the above-specified range of the content of the dispersant.

The coloring particles in accordance with the present invention are preferably constituted to include the pigment and the water-insoluble polymer dispersant, in view of dispersion stability and the jetting property, and are preferably constituted such that at least a portion of the pigment surface is coated with a water-insoluble polymer dispersant. These coloring particles can be obtained as a coloring particle dispersion, by dispersing a mixture containing, for example, a pigment, a dispersant, optionally a solvent (preferably, an organic solvent) and the like, using a dispersing machine.

The coloring particle dispersion is produced as a dispersion, for example, by adding an aqueous solution containing a basic substance to a mixture of the pigment, the water-insoluble polymer dispersant, and an organic solvent which dissolves or disperses the dispersant (mixing and hydration step), and then removing the organic solvent (solvent removal step). In this manner, a coloring particle dispersion with fine dispersion of a colorant and excellent storage stability can be produced.

The organic solvent needs to be able to dissolve or disperse the dispersant, but in addition to this, it is preferable that the solvent has a certain degree of affinity to water. Specifically, the solubility in water at 20° C. is preferably from 10% by mass to 50% by mass.

The coloring particle dispersion can be produced more particularly by a production method including a step (1) and a step (2) shown below, but the method is not limited thereto.

Step (1): a step of dispersing a mixture containing a pigment, a dispersant, an organic solvent which dissolves or disperses the dispersant, and a solution containing a basic substance and containing water as a main component.

Step (2): a step of removing at least a portion of the organic solvent from the mixture after the dispersion treatment.

In the step (1), first, the dispersant is dissolved or dispersed in an organic solvent to obtain a mixture (mixing step). Subsequently, a solution containing a colorant and a basic substance and containing water as a main component, water, and optionally a surfactant or the like, are added to the mixture, and the mixture is mixed and dispersed to obtain an oil-in-water type dispersion.

The basic material is used for the neutralization of an anionic group (preferably a carboxy group) that may be present in a polymer. The neutralization degree of an anionic group is not particularly limited. Usually, it is preferable that the liquid property of the finally obtained coloring particle dispersion, for example, a pH thereof is in the range of 4.5 to 10. The pH can be determined depending on the desired neutralization degree of the polymer.

Preferable examples of the organic solvent include an alcohol solvent, a ketone solvent, and an ether solvent. Among them, examples of the alcohol solvent include ethanol, isopropanol, n-butanol, tertiary butanol, isobutanol, and diacetone alcohol. Examples of the ketone solvent include acetone, methyl ethyl ketone, diethyl ketone, and methyl isobutyl ketone. Examples of the ether solvent include dibutyl ether, tetrahydrofuran, and dioxane. Among these solvents, isopropanol, acetone and methyl ethyl ketone are preferable, and particularly, methyl ethyl ketone is preferable. These organic solvents may be used alone or in a combination of several types.

In the production of the coloring particle dispersion, the kneading dispersion treatment can be carried out using a double roll mill, a triple roll mill, a ball mill, a Tron mill, a Disper, a kneader, a co-kneader, a homogenizer, a blender, a single-screw or twin-screw extruder, or the like, while applying strong shear force. In addition, the details of the kneading and dispersion are described in T. C. Patton, "Paint Flow and Pigment Dispersion" (1964, published by John Wiley and Sons, Inc.), and the like.

Optionally, the coloring particle dispersion can be obtained by performing a fine dispersion treatment with beads having a particle diameter of 0.01 mm to 1 mm and formed of glass, zirconia or the like, using a vertical type or horizontal type sand grinder, a pin mill, a slit mill, an ultrasonic disperser or the like.

In the method for producing a coloring particle dispersion in accordance with the present invention, the removal of the organic solvent is not particularly limited, and the solvent can be removed by a known method such as distillation under reduced pressure.

The coloring particles in the coloring particle dispersion thus obtained maintain a good dispersed state, and the obtained coloring particle dispersion has excellent stability over time.

The volume average particle diameter of the pigment (or coloring particles) in accordance with the present invention is preferably in the range of 10 nm to 200 nm, more preferably 10 nm to 150 nm and further preferably 10 nm to 100 nm. When the volume average particle diameter is 200 nm or less, the color reproducibility is satisfactory, and in the case of an inkjet method, the droplet jetting properties are good. Further, when the volume average particle diameter is 10 nm or more, light-fastness is satisfactory.

The particle diameter distribution of the pigment (or coloring particles) is not particularly limited, and may be any of a broad particle diameter distribution and a monodisperse particle diameter distribution. Two or more types of pigments having a monodisperse particle diameter distribution may also be used as a mixture.

The volume average particle diameter and particle diameter distribution of the pigment (or coloring particles) can be measured, for example, using a light scattering method.

In the present invention, the pigments (or coloring particles) may be used alone or in a combination of two or more thereof.

[Aqueous Medium]

The ink composition in accordance with the present invention contains water, and may optionally contain at least one water-soluble organic solvent to be described below.

Water used in the present invention is preferably ionic impurity-free water such as ion-exchanged water or distilled water. Further, the water content in the ink composition may be appropriately selected depending on the purpose. Usually, the water content is preferably in the range of 10% by mass to 95% by mass, and more preferably 30% by mass to 90% by mass.

(Water-Soluble Organic Solvent)

The ink composition in accordance with the present invention may contain at least one water-soluble organic solvent. By incorporating the water-soluble organic solvent, effects of drying prevention, moisturizing or promoting penetration may be obtained. In order to prevent drying, the solvent may be used as an anti-drying agent for preventing nozzle clogging due to aggregation of ink that has attached and dried at a jetting port of a jetting nozzle. In terms of drying prevention or moisturizing, a water-soluble organic solvent having a lower vapor pressure than that of water is preferably used. In terms of promoting penetration, the solvent may be used as a penetration promoter for improving the penetration ability of ink into a paper.

Examples of the water-soluble organic solvent include alkanediols (polyhydric alcohols) such as glycerin, 1,2,6-hexanetriol, trimethylolpropane, ethylene glycol and propylene glycol; sugar alcohols; alkyl alcohols having 1 to 4 carbon atoms such as ethanol, methanol, butanol, propanol and isopropanol; and glycol ethers such as ethylene glycol monomethyl ether, ethylene glycol monoethyl ether, ethylene glycol monobutyl ether, ethylene glycol monomethylether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, triethylene glycol monoethyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol, dipropylene glycol monomethyl ether, dipropylene glycol monoethyl ether, dipropylene glycol mono-n-propyl ether, dipropylene glycol mono-iso-propyl ether, and tripropylene glycol monomethyl ether. These organic solvents may be used alone or in a combination of two or more thereof.

In order to prevent drying or for moisturizing, polyhydric alcohols are usable. Examples of the polyhydric alcohols include glycerin, ethylene glycol, diethylene glycol, triethylene glycol, propylene glycol, dipropylene glycol, tripropylene glycol, 1,3-butanediol, and 2,3-butanediol. These polyhydric alcohols may be used alone or in a combination of two or more thereof.

In order to promote penetration, a polyol compound is preferable, and an aliphatic diol is suitably used. Examples of the aliphatic diol include 2-ethyl-2-methyl-1,3-propanediol, 3,3-dimethyl-1,2-butanediol, 2,2-diethyl-1,3-propanediol, 2-ethyl-1,3-hexanediol, and 2,2,4-trimethyl-1,3-pentanediol. Among them, 2-ethyl-1,3-hexanediol and 2,2,4-trimethyl-1,3-pentanediol are mentioned as the preferred examples.

The water-soluble organic solvent in accordance with the present invention preferably contains at least one compound represented by the following structural formula (1), in view of inhibiting the occurrence of curling in a recording medium.

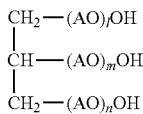

Structural formula (1)

In the structural formula (1), l, m and n each independently represent an integer of 1 or more, l+m+n=3 to 15, and l+m+n is preferably in the range of 3 to 12, more preferably the range of 3 to 10. If the value of l+m+n is 3 or higher, satisfactory curling inhibition is achieved. If the value of l+m+n is 15 or less, satisfactory jetting properties can be obtained. In the structural formula (1), AO represents ethyleneoxy (EO) and/or propyleneoxy (PO). Among them, a propyleneoxy group is preferable. Individual AO in $(AO)_l$, $(AO)_m$, and $(AO)_n$ may be the same or different.

Hereinafter, examples of the compound represented by the structural formula (1) are illustrated. However, the present invention is not limited thereto. Among the exemplary compounds, the expression "POP (3) glyceryl ether" means a glyceryl ether wherein a total of three propylene oxy groups are bonded to glycerin, and the same shall apply to other expressions.

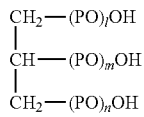

l+m+n=3 POP (3) glyceryl ether
l+m+n=4 POP (4) glyceryl ether
l+m+n=5 POP (5) glyceryl ether
l+m+n=6 POP (6) glyceryl ether
l+m+n=7 POP (7) glyceryl ether In view of inhibiting the occurrence of curling in a recording medium, the water-soluble organic solvent in accordance with the present invention is also preferably a water-soluble organic solvent illustrated below.

n-$C_4H_9O(AO)_4$—H (AO=EO or PO, ratio of EO:PO=1:1)
n-$C_4H_9O(AO)_{10}$—H (AO=EO or PO, ratio of EO:PO=1:1)
$HO(AO)_{40}$—H (AO=EO or PO, ratio of EO:PO=1:3)
$HO(AO)_{55}$—H (AO=EO or PO, ratio of EO:PO=5:6)
$HO(PO)_3$—H
$HO(PO)_7$—H
1,2-hexanediol The water-soluble organic solvents in accordance with the present invention may be used alone or in a combination of two or more thereof.

The content of the water-soluble organic solvent in the ink composition is preferably in the range of from 1% by mass to 60% by mass, more preferably from 5% by mass to 40% by mass.

(Resin Particles)

The ink composition in accordance with the present invention may optionally contain resin particles. The resin particles preferably have a function of fixing an ink composition, that is, an image, by increasing the viscosity of an ink through the aggregation of resin particles or the destabilization of the dispersion of the resin particles when the resin particles are brought into contact with a treatment liquid to be described below or a paper region in which the treatment liquid has been dried. These resin particles are preferably dispersed in water and at least one organic solvent.

Examples of the resin particles include an acrylic resin, a vinyl acetate resin, a styrene-butadiene resin, a vinyl chloride resin, an acryl-styrene resin, a butadiene resin, a styrene resin, a cross-linked acrylic resin, a cross-linked styrene resin, a benzoguanamine resin, a phenolic resin, a silicone resin, an epoxy resin, an urethane resin, a paraffinic resin, a fluoric resin, and a latex thereof. Preferable examples include an acrylic resin, an acryl-styrene resin, a styrene resin, a cross-linked acrylic resin, and a cross-linked styrene resin.

Further, the resin particles may also be used in the form of latex.

The weight average molecular weight of the resin particles is preferably from 10,000 to 200,000, and more preferably from 100,000 to 200,000.

The average particle diameter of the resin particles is preferably in the range of 10 nm to 1 μm, more preferably 10 nm to 200 nm, still more preferably 20 nm to 100 nm, and particularly preferably 20 nm to 50 nm.

The glass transition temperature Tg of the resin particles is preferably 30° C. or higher, more preferably 40° C. or higher, and still more preferably 50° C. or higher.

An added amount of the resin particles is preferably in the range of 0.1% by mass to 20% by mass, more preferably 0.1% by mass to 20% by mass, and still more preferably 0.1% by mass to 15% by mass, with respect to the mass of the ink composition.

The particle diameter distribution of the resin particles is not particularly limited, and may be any of a broad particle diameter distribution and a monodisperse particle diameter distribution. Two or more types of resin particles having a monodisperse particle diameter distribution may also be used as a mixture.

(Surfactant)

The ink composition in accordance with the present invention may optionally contain at least one surfactant. The surfactant may also be used as a surface tension adjusting agent.

As the surface tension adjusting agent, a compound with a structure containing hydrophilic and hydrophobic moieties within the molecule thereof can be effectively used. Any of an anionic surfactant, a cationic surfactant, an amphoteric surfactant, a nonionic surfactant, and a betaine surfactant can be used. Further, the above-mentioned dispersant (polymer dispersant) can also be used as a surfactant.

In the present invention, a nonionic surfactant is preferable in view of inhibiting interference of jetted ink droplets. Among them, an acetylene glycol derivative is more preferable.

When a surfactant (surface tension adjusting agent) is contained in the ink composition, the surfactant is added in an amount such that the surface tension of the ink composition is adjusted to the range of preferably 20 mN/m to 60 mN/m, more preferably 20 mN/m to 45 mN/m, and further preferably 25 mN/m to 40 mN/m, in order to jet the ink composition well with an inkjet method.

A specific amount of the surfactant in the ink composition is not particularly limited except that the range providing the above-specified surface tension is preferable. The amount of the surfactant is preferably 1% by mass or more, more preferably 1% by mass to 10% by mass, and more preferably 1% by mass to 3% by mass.

(Other Components)

The ink composition of the present invention may further optionally contain various additives as the other components, in addition to the above-described components.

Examples of the various additives include known additives such as an ultraviolet absorbent, an anti-fading agent, an antifungal agent, a pH-adjusting agent, an anti-corrosive agent, an antioxidant, an emulsification stabilizer, a preservative, an anti-foaming agent, a viscosity modifier, a dispersion stabilizer, a chelating agent, and a solid wetting agent.

Examples of the ultraviolet absorbent include a benzophenone ultraviolet absorbent, a benzotriazole ultraviolet absorbent, a salicylate ultraviolet absorbent, a cyanoacrylate ultraviolet absorbent, and a nickel complex salt ultraviolet absorbent.

As the anti-fading agent, a variety of organic and metal complex anti-fading agents can be used. Examples of the organic anti-fading agent include hydroquinones, alkoxyphenols, dialkoxyphenols, phenols, anilines, amines, indanes, chromans, alkoxyanilines, and hetero rings. Examples of the metal complex include nickel complexes and zinc complexes.

Examples of the antifungal agent include sodium dehydroacetate, sodium benzoate, sodium pyridinethione-1-oxide, ethyl p-hydroxybenzoate, and 1,2-benzisothiazolin-3-one, sodium sorbate, and sodium pentachlorophenol.

The content of the antifungal agent in the ink composition is preferably in the range of 0.02% by mass to 1.00% by mass.

The pH-adjusting agent is not particularly limited as long as it is capable of adjusting pH to a desired value without causing a negative effect on the ink composition to be prepared, and can be appropriately selected depending on the purpose. Examples of the pH-adjusting agent include alcoholic amines (for example, diethanolamine, triethanolamine, and 2-amino-2-ethyl-1,3-propanediol), alkali metal hydroxides (for example, lithium hydroxide, sodium hydroxide, and potassium hydroxide), ammonium hydroxides (for example, ammonium hydroxide, and quaternary ammonium hydroxide), phosphonium hydroxides, and alkali metal carbonates.

Examples of the anti-corrosive agent include an acidic sulfite salt, sodium thiosulfate, ammonium thiodiglycolate, diisopropyl ammonium nitrite, pentaerythritol tetranitrate, and dicyclohexyl ammonium nitrite.

Examples of the antioxidant include a phenolic antioxidant (including hindered phenol antioxidant), an amine antioxidant, a sulfuric antioxidant, and a phosphorus antioxidant.

Examples of the chelating agent include sodium ethylenediamine tetraacetate, sodium nitrilo triacetate, sodium hydroxyethyl ethylenediamine triacetate, sodium diethylenetriamine pentaacetate, and sodium uramil diacetate.

—Properties of Ink Composition—

The surface tension (25° C.) of the ink composition in accordance with the present invention is preferably from 20 mN/m to 60 mN/m, more preferably from 20 mN/m to 45 mN/m, and further preferably from 25 mN/m to 40 mN/m.

The surface tension of the ink composition is measured using an Automatic Surface Tensiometer CBVP-Z (trade name, manufactured by Kyowa Interface Science Co., Ltd.) at 25° C.

The viscosity at 25° C. of the ink composition in accordance with the present invention is preferably from 1.2 mPa·s to 15.0 mPa·s, more preferably from 2 mPa·s to less than 13 mPa·s, further preferably from 2.5 mPa·s to less than 10 mPa·s.

The viscosity of the ink composition is measured using a VISCOMETER TV-22 (trade name, manufactured by Toki Sangyo Co., Ltd.) under conditions of 25° C.

<Method for Producing Ink Composition>

The method for producing ink composition in accordance with the present invention includes a step of mixing an organic solvent solution containing a water-insoluble polymerization initiator with an aqueous solution containing a water-soluble polymer to obtain initiator particles containing a water-insoluble polymerization initiator and a water-soluble polymer and having a volume average particle diameter of 500 nm or less, a step of mixing the initiator particles, a water-soluble polymerizable compound, a pigment, and water to obtain an ink composition, and optionally other steps.

The ink composition produced in this production method is superior in terms of the jetting property, curing sensitivity, and ink stability.

The step of obtaining the initiator particles is as described above.

With regard to a method of mixing the obtained initiator particles, a water-soluble polymerizable compound, a pigment, water, and optionally-contained other components, a conventionally used mixing method may be used without particular limitation.

The method of the present invention preferably includes a step of removing coarse particles after mixing of the components. Removal of coarse particles can be carried out, for example, by using an appropriately selected membrane filter.

<Ink Set>

The ink set in accordance with the present invention includes the at least one ink composition and at least one treatment liquid capable of forming an aggregate by contact with the ink composition. By forming an image using such an ink set, an image with excellent scratch resistance can be formed with high definition at high speed.

Details of the ink composition included in the ink set are as described above, and a preferable embodiment thereof is also the same.

[Treatment Liquid]

The treatment liquid contains at least an aggregating agent that aggregates components in the ink composition, and may optionally contain other components. By using the treatment liquid together with the ink composition, an image capable of achieving high-speed inkjet recording and having high density and resolution and an excellent delineation property (for example, reproducibility of fine lines or fine portions) can be formed even during high-speed recording. Incorporation of an aggregating agent in the treatment liquid enables the formation of an image having good image quality and excellent scratch resistance.

(Aggregating Agent)

The treatment liquid contains at least one aggregating agent that aggregates components in the ink composition. The aggregating agent in accordance with the present invention is capable of aggregating (fixing) the ink composition by being brought into contact with the ink composition on a recording medium, and functions as a fixing agent. For example, in a state where an aggregating agent is present on a recording medium by applying a treatment liquid on the recording medium (preferably, coated paper), the ink composition is further applied to contact the aggregating agent, whereby the components in the ink composition aggregate to fix the ink composition on the recording medium.

Examples of the component that fixes the components in the ink composition include an acidic compound, a polyvalent metal salt, and a cationic polymer. These may be used alone or in a combination of two or more thereof.

—Acidic Compound—

Examples of the acidic compound include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, metaphosphoric acid, pyrrolidone carboxylic acid, pyrone carboxylic acid, pyrrole carboxylic acid, furan carboxylic acid, pyridine carboxylic acid, coumarinic acid, thiophene carboxylic acid, nicotinic acid, derivatives of these compounds, and salts thereof.

In particular, an acidic compound having high water-solubility is preferable. In view of fixing the whole ink through the reaction with the ink composition, an acidic compound having a valence of three or less is preferable and an acidic compound having a valence of two to three is particularly preferable.

The acidic compounds may be used alone or in a combination of two or more thereof.

When the treatment liquid contains the acidic compound, the pH (25° C.) of the treatment liquid is preferably in the range of 0.1 to 6.8, more preferably from 0.5 to 6.0, and still more preferably from 0.8 to 5.0.

The content of the acidic compound is preferably 40% by mass or less, and more preferably 15% by mass to 40% by mass, with respect to the total mass of the treatment liquid. When the content of the acidic compound is 15% by mass to 40% by mass, components in the ink composition can be more efficiently fixed.

Further, the content of the acidic compound is preferably in the range of 15% by mass to 35% by mass, with respect to the total mass of the treatment liquid.

An application amount of the acidic compound to a recording medium is not particularly limited as long as it is an amount sufficient to aggregate the ink composition. In view of easily fixing the ink composition, the application amount of the acidic compound is preferably in the range of 0.5 g/m² to 4.0 g/m², and more preferably 0.9 g/m² to 3.75 g/m².

—Polyvalent Metal Salt—

The polyvalent metal salt in accordance with the present invention is a compound containing a metal having a valence of two or higher such as an alkaline earth metal or a zinc group metal, and examples thereof include acetic acid salts and oxides of a metal ion such as $Ca^{2+}$, $Cu^{2+}$ or $Al^{3+}$.

In the present invention, an aggregation reaction of an ink composition when the ink composition is jetted to a recording medium (preferably, coated paper) onto which the treatment liquid containing a polyvalent metal salt is applied can be achieved by decreasing the dispersion stability of particles dispersed in the ink composition, for example, a colorant such as a pigment or particles such as resin particles, thereby increasing the total viscosity of the ink composition. For example, when the pigment or particles such as resin particles in the ink composition have a weak acidic functional group such as a carboxy group, the particles are dispersion-stabilized by the function of the weak acidic functional group, but the dispersion stability can be lowered by decreasing the surface charge of the particles through the interaction with a polyvalent metal salt. Accordingly, the polyvalent metal salt as a fixing agent contained in the treatment liquid is required to have a valence of two or higher, that is polyvalence, in view of the aggregation reaction. In view of aggregation reactivity, a polyvalent metal salt of polyvalent metal ions having a valence of three or higher is preferable.

In view of the foregoing, the polyvalent metal salt that can be used in the treatment liquid in accordance with the present invention is preferably at least one of a salt of a polyvalent metal ion with an anion, polyaluminum hydroxide and polyaluminum chloride, which are illustrated below.

Examples of the polyvalent metal ion include $Ca^{2+}$, $Cu^{2+}$, $Ni^{2+}$, $Mg^{2+}$, $Sr^{2+}$, $Zn^{2+}$, $Ba^{2+}$, $Al^{3+}$, $Fe^{3+}$, $Cr^{3+}$, $Co^{3+}$, $Fe^{2+}$, $La^{3+}$, $Nd^{3+}$, $Y^{3+}$, and $Zr^{4+}$. For incorporation of these polyvalent metal ions into a treatment liquid, salts of polyvalent metals as described above may be used.

The salt is a metal salt formed of the above-mentioned polyvalent metal ions and anions bonding to these ions, but it is preferably soluble in a solvent. Here, the solvent is a medium that constitutes a treatment liquid together with the polyvalent metal salt, and examples thereof include water, and an organic solvent that is optionally contained.

Examples of the preferable anion to form a salt with the polyvalent metal ion include $Cl^-$, $NO_3^-$, $F^-$, $Br^-$, $ClO_3^-$, $CH_3COO^-$, and $SO_4^{2-}$.

The polyvalent metal ion and anion can form a salt of a polyvalent metal ion with an anion, using single kind or several kinds thereof.

Other examples of the polyvalent metal salt include polyaluminum hydroxide and polyaluminum chloride.

In the present invention, the use of a salt of a polyvalent metal ion with an anion is preferable in view of reactivity, colorability and easy handling. The polyvalent metal ion is preferably at least one selected from $Ca^{3+}$, $Mg^{3+}$, $Sr^{3+}$, $Al^{3+}$ and $Y^{3+}$, and more preferably $Ca^{2+}$.

In view of solubility, $NO_3^-$ is particularly preferable as the anion.

The polyvalent metal salts may be used alone or in a combination of two or more thereof.

The content of the polyvalent metal salt may be 15% by mass or more with respect to the total mass of the treatment liquid. When the content of the polyvalent metal salt is 15% by mass or more, components in the ink composition can be more effectively fixed.

The content of the polyvalent metal salt is preferably in the range of 15% by mass to 35% by mass, with respect to the total mass of the treatment liquid.

An application amount of the polyvalent metal salt to a recording medium is not particularly limited as long as it is an amount sufficient to aggregate the ink composition. In view of easily fixing the ink composition, the application amount is preferably in the range of 0.5 g/m² to 4.0 g/m², and more preferably 0.9 g/m² to 3.75 g/m².

—Cationic Polymer—

The cationic polymer may be at least one cationic polymer selected from a poly(vinyl pyridine) salt, polyalkylaminoethyl acrylate, polyalkylaminoethyl methacrylate, poly(vinyl imidazole), polyethylene imine, polybiguanide, and polyguanide.

The cationic polymers may be used alone or in a combination of two or more thereof.

Among the cationic polymers, preferred are polyguanide (preferably, poly(hexamethylene guanidine)acetate, polymonoguanide or polymeric biguanide), polyethylene imine, and poly(vinyl pyridine), which are advantageous in view of aggregation rate.

It is preferable in view of viscosity of a treatment liquid that a weight average molecular weight of the cationic polymer is smaller. When the treatment liquid is applied to a recording medium by an inkjet method, the weight average molecular weight of the cationic polymer is preferably in the range of 500 to 500,000, more preferably 700 to 200,000, and still more preferably 1,000 to 100,000. If the weight average molecular weight is 500 or more, it is advantageous in view of aggregation rate. If the weight average molecular weight is 500,000 or less, it is advantageous in view of jetting reliability. However, there is an exception when a treatment liquid is applied to a recording medium by a method other than an inkjet method.

When the treatment liquid contains a cationic polymer, a pH (25° C.) of the treatment liquid is preferably in the range of 1.0 to 10.0, more preferably 2.0 to 9.0, and still more preferably 3.0 to 7.0.

The content of the cationic polymer is preferably in the range of 1% by mass to 35% by mass, and more preferably 5% by mass to 25% by mass, with respect to the total mass of the treatment liquid.

An application amount of the cationic polymer to a recording medium is not particularly limited as long as it is an amount sufficient to fix the ink composition. In view of easily fixing the ink composition, the application amount is preferably in the range of 0.5 g/m$^2$ to 4.0 g/m$^2$, and more preferably 0.9 g/m$^2$ to 3.75 g/m$^2$.

The treatment liquid may further contain other additives as the other components within the scope of not impairing the effect of the present invention, in addition to the above-described components. Examples of the other additives include known additives such as an initiator, an anti-drying agent (wetting agent), an anti-fading agent, an emulsification stabilizer, a penetration promoting agent, an ultraviolet absorbent, a preservative, an antifungal agent, a pH-adjusting agent, a surface tension adjusting agent, an anti-foaming agent, a viscosity modifier, a dispersant, a dispersion stabilizer, an anti-corrosive agent, and a chelating agent, which are described in detail in the section for an ink composition.

<Image Forming Method>

The image forming method in accordance with the present invention uses the ink composition and treatment liquid as described hereinbefore, and includes an ink applying step of applying an ink composition containing initiator particles including a water-insoluble polymerization initiator and a water-soluble polymer and having a volume average particle diameter of 500 nm or less, a water-soluble polymerizable compound, a pigment and water to a recording medium by an inkjet method, thereby forming an image, and a treatment liquid applying step of applying a treatment liquid capable of forming an aggregate through the contact with the ink composition to the recording medium. Further, the image forming method in accordance with the present invention may optionally include other steps.

Hereinafter, individual steps constituting the image forming method in accordance with the present invention are described.

(Ink Applying Step)

The ink applying step supplies the above-described ink composition onto a recording medium by an inkjet method. In the present step, the ink composition can be selectively applied to the recording medium so that a desired visible image can be formed. The details of the ink composition and preferred embodiments of the ink composition are as described above for the ink composition.

Image recording utilizing the inkjet method can be performed, specifically, by applying energy thereby jetting an ink composition to a desired recording medium, that is, plain paper, high-quality paper, coated paper, art paper, resin-coated paper, paper used exclusively for inkjet recording described, for example, in JP-A Nos. 8-169172, 8-27693, 2-276670, 7-276789, 9-323475, 62-238783, 10-153989, 10-217473, 10-235995, 10-337947, 10-217597, and 10-337947, films, general use paper for electrophotography, clothes, glass, metals, ceramics, etc. As the inkjet recording method preferable to the present invention, a method described in the paragraphs [0093] to [0105] of JP-A No. 2003-306623 may be applicable.

The inkjet method is not particularly limited and may be of any known system, for example, a charge control system of jetting an ink by utilizing an electrostatic attraction force, a drop on demand system of utilizing a vibration pressure of a piezo element (pressure pulse system), an acoustic inkjet system of converting electric signals into acoustic beams, irradiating them to an ink, and jetting the ink by utilizing a radiation pressure, and a thermal inkjet system of heating an ink to form bubbles and utilizing the resultant pressure (BUBBLEJET (registered trade mark)).

Examples of the inkjet method include a system of injecting a number of ink droplets of low concentration, a so-called "photo-ink" each in a small volume, a system of improving an image quality by using plural kinds of inks of a substantially identical hue but different densities, and a system of using a colorless transparent ink.

The inkjet head used in the inkjet method may be either an on-demand system or a continuous system.

An ink nozzle, and the like used for recording by the inkjet method are not particularly limited and can be appropriately selected depending on the purpose.

Examples of the inkjet method include a shuttle system of performing recording using a short serial head while scanning the head in the width direction of a recording medium and a line system using a line head in which recording devices are arranged corresponding to the full width of a recording medium. In the line system, image recording can be performed throughout the surface of the recording medium by scanning the recording medium in the direction orthogonal to the arrangement direction of the recording devices, and therefore conveyance systems for scanning the short head, such as a carriage, become unnecessary. Further, since complicated scanning control for the movement of the carriage and the recording medium becomes unnecessary and only the recording medium is moved, higher recording speed can be attained compared with the shuttle system. While the image forming method of the present invention is applicable to any one of them, the effect of improving the jetting accuracy and the scratch resistance of the image is remarkable when the method is applied to the line system usually not performing dummy jetting.

In view of obtaining high definition images, the amount of an ink droplet jetted from an inkjet head is preferably in the range of 1 pl to 10 pl (picoliters), and more preferably 1.5 pl to 6 pl. In view of improving image unevenness and continuity in tone, jetting with a combination of different droplet amounts is also effective. The present invention can also be preferably used in these cases.

In the present invention, a maximum application amount of the ink composition to the recording medium is preferably in the range of 10 ml/m$^2$ to 36 ml/m$^2$, more preferably 15 ml/m$^2$ to 30 ml/m$^2$, in view of image adhesion and image density.

<Treatment Liquid Applying Step>

In the treatment liquid applying step, a treatment liquid which contains an aggregating agent for aggregating the components present in the ink composition is applied on a recording medium, so that the aggregating agent is brought into contact with the ink composition to thereby form an image. In this case, dispersed particles such as pigment in the ink composition are aggregated, whereby an image is fixed on the recording medium. The treatment liquid contains at least an aggregating agent, and the details of each component and preferable embodiments are as described above.

The treatment liquid may be applied using a known method such as a coating method, an inkjet method or a dip method. Coating methods may be performed according to a known coating method using a bar coater, an extrusion die coater, an air doctor coater, a blade coater, a rod coater, a knife coater, a squeeze coater, a reverse roll coater or the like. The details of the inkjet method are as described above.

The treatment liquid applying step may be provided before or after the ink applying step using an ink composition. In the present invention, an embodiment in which the ink applying step is provided after applying a treatment liquid in the treatment liquid applying step is preferable. Specifically, an embodiment in which a treatment liquid for aggregating a pigment (preferably coloring particles containing a pigment) in an ink composition is applied on a recording medium in advance before applying the ink composition, and the ink composition is applied in such a manner as to contact with the treatment liquid applied on the recording medium to thereby form an image is preferable. Thus, an inkjet recording speed can be increased and therefore images with high density and high resolution are obtained even in the case of high speed recording.

The amount of application of the treatment liquid is preferably such that the aggregating agent can be applied in an amount of 0.1 $g/m^2$ or more, while it is not particularly limited as long as the ink composition can be aggregated. In particular, the aggregating agent is preferably applied in an amount of 0.2 $g/m^2$ to 0.7 $g/m^2$. When the application amount of the aggregating agent is 0.1 $g/m^2$ or more, favorable high speed aggregation properties can be maintained according to various application forms of the ink composition. When the application amount of the aggregating agent is 0.7 $g/m^2$ or less, it is preferable in that there are no adverse effects (changes in glossiness) on surface properties of the recording medium to which the aggregating agent is applied.

In the present invention, it is preferable to provide the ink applying step after the treatment liquid applying step and further provide a heating/drying step for heating and drying the treatment liquid on the recording medium after applying the treatment liquid on the recording medium but before applying the ink composition. When the treatment liquid is dried by heating in advance before the ink applying step, ink colorability, such as prevention of blurring, become favorable, and thus visible images having a favorable color density and a favorable hue can be recorded.

The heating and drying may be performed with a known heating unit, such as a heater, or an air blowing unit utilizing blowing of air, such as a drier, or a unit having a combination thereof. Examples of the heating method include: a method of applying heat to the side of the recording medium opposite to the side thereof on which the treatment liquid has been applied, using a heater or the like; a method of blowing a warm or hot air to the surface of the recording medium on which the treatment liquid has been applied; a heating method using an infrared heater; and a combination of two or more of the above methods.

(Polymerization Step)

The image forming method in accordance with the present invention preferably includes a polymerization step of irradiating active energy rays to an ink composition applied on a recording medium. Irradiation of active energy rays lead to polymerization of a water-soluble polymerizable compound contained in the ink composition, thereby forming a cured film containing a pigment. Accordingly, scratch resistance and blocking resistance of the image are more effectively improved.

The ink composition applied onto a recording medium is cured by irradiation with active energy rays. This is because the water-insoluble polymerization initiator included in the ink composition of the present invention is degraded by irradiation of active energy rays, and generates initiation species such as radicals, acid, base, which cause and promote a polymerization reaction of a polymerizable compound to cure the ink composition.

Herein, as active energy rays, a rays, y rays, electron rays, X rays, UV rays, visible rays, infrared rays or the like can be used. The wavelength of the active energy rays is preferably in the range of 200 nm to 600 nm, more preferably 300 nm to 450 nm, and still more preferably 350 nm to 420 nm.

The output of active energy rays is preferably 5,000 mJ/$cm^2$ or less, more preferably 10 mJ/$cm^2$ to 4,000 mJ/$cm^2$, and still more preferably 20 mJ/$cm^2$ to 3,000 mJ/$cm^2$.

As for the active energy ray source, a mercury lamp, a gas/solid laser and the like are principally utilized, and for curing of the ultraviolet photo-curable inkjet recording ink, a mercury lamp and a metal halide lamp are widely known. Further, since there is currently a strong need for being mercury-free in view of environmental protection, replacement by a GaN-based semiconductor ultraviolet light-emitting device is industrially and environmentally very useful. In addition, LED (UV-LED) and LD (UV-LD) are compact, long-lived, highly efficient and have low costs and are promising as light sources for a photocurable inkjet ink.

Further, a light-emitting diode (LED) and a laser diode (LD) can be used as the active radiation source. In particular, when an ultraviolet source is necessary, an ultraviolet LED or an ultraviolet LD can be used. For example, an ultraviolet LED of which the main emission spectrum has a wavelength between 365 nm and 420 nm is commercially available from Nichia Corporation.

The active energy ray source particularly preferable in the present invention is a UV-LED, particularly preferably a UV-LED having a peak wavelength in the region of 350 nm to 420 nm.

(Drying Step)

The method of the present invention preferably further includes a drying step of removing at least a portion of water contained in the ink composition that is applied on the recording medium by the ink applying step.

The drying step may be carried out before the polymerization step or after the polymerization step. In view of scratch resistance and adhesion of the formed image, the drying step is preferably carried out before the polymerization step.

Although the method of removing water in the drying step is not particularly limited, removal of water by a heating treatment is preferable.

The heating method is not particularly limited, and preferable examples thereof include non-contact type drying methods such as a method of heating by a heat-generating member such as a nichrome wire heater, a method of blowing warm or hot air, and a method of heating by a halogen lamp, an infrared lamp or the like.

(Recording Medium)

In the image forming method of the present invention, an image is recorded on a recording medium. The recording medium is not particularly limited, and may be a cellulose-based general printing paper, such as so-called high-quality paper, coated paper, or art paper, which is used for general offset printing and the like. When image recording is performed on the cellulose-based general printing paper by a general inkjet method using an aqueous ink, absorption and drying of the ink is relatively slow, migration of a coloring material easily occurs after ink application, and image quality tends to lower. In contrast, according to the image forming method of the present invention, a high-quality image recording having excellent color density and hue can be achieved while suppressing the migration of the colorant.

The recording medium may be a commercially-available product, and examples thereof include high-quality paper (A) such as OK PRINCE HIGH-QUALITY (trade name) manufactured by Oji Paper Co., Ltd., SHIORAI (trade name) manufactured by Nippon Paper Industries Co., Ltd. and NEW NPI HIGH-QUALITY (trade name) manufactured by Nippon Paper Industries Co., Ltd.; lightly coated paper such as OK EVER LIGHT COAT (trade name) manufactured by Oji Paper Co., Ltd. and AURORA S (trade name) manufactured by Nippon Paper Industries Co., Ltd.; lightweight coated paper (A3) such as OK COAT L (trade name) manufactured by Oji Paper Co., Ltd. and AURORA L (trade name) manufactured by Nippon Paper Industries Co., Ltd.; coated paper (A2, B2) such as OK TOPCOAT+ (trade name) manufactured by Oji Paper Co., Ltd. and AURORA COAT (trade name) manufactured by Nippon Paper Industries Co., Ltd.; and art paper (A1) such as OK KINFUJI+ (trade name) manufactured by Oji Paper Co., Ltd. and TOKUBISHI ART (trade name) manufactured by Mitsubishi Papers Mills Ltd. Various types of photo paper for inkjet recording may also be used.

Among the recording media, coated paper, which is used for general offset printing or the like, is preferable. The coated paper is produced by coating a surface of cellulose-based paper (such as high-quality paper or neutral paper), which has not been subjected to surface treatment, with a coating material so as to form a coating layer. When image forming is performed by a conventional water-based inkjet ink, the coated paper tends to cause problems in quality, for example in image gloss or scratch resistance. However, unevenness in gloss is suppressed and an image having excellent gloss and scratch resistance can be obtained according to the image forming method of the present invention even when the coated paper is used. In particular, it is preferable to use a coated paper having base paper and a coating layer including an inorganic pigment, and it is more preferable to use a coated paper having base paper and a coating layer including kaolin and/or calcium bicarbonate. Specifically, art paper, coated paper, lightweight coated paper, or very light-weight coated paper is more preferable.

(Inkjet Recording Apparatus)

Next, an example of an inkjet recording apparatus favorably used for the image forming method of the present invention will be explained in detail with reference to FIG. 1. FIG. 1 is a schematic diagram showing an example of a structure of the entire inkjet recording apparatus.

As shown in FIG. 1, the inkjet recording apparatus includes: treatment liquid application unit 12, having treatment liquid jetting head 12S that jets the treatment liquid; treatment liquid drying zone 13, having heating unit (not shown) that dries the applied treatment liquid; ink jetting unit 14 that jets various ink compositions; and ink drying zone 15 at which the jetted ink composition is dried, in this order in the conveyance direction of the recording medium (the direction of the arrow shown in the figure). Further, ultraviolet irradiating unit 16 having ultraviolet irradiating lamp 16S is provided at a downstream side of ink drying zone 15 in the conveyance direction of the recording medium.

The recording medium that has been supplied to the inkjet recording apparatus is conveyed by conveyance rollers from a paper feed section to the treatment liquid application unit 12, then to the treatment liquid drying zone 13, then to the ink jetting unit 14, then to the ink drying zone 15, and then to the ultraviolet irradiating unit 16, and then accumulated in an accumulation section. The paper feed section feeds sheets of the recording medium from a case in which the recording media are loaded. The conveyance of the recording medium may be conducted by a method using conveyance rollers, or methods other than the method using conveyance rollers, and examples of the other methods include a drum conveyance method using a drum-shaped member, a belt conveyance method, or a stage conveyance method using a stage.

Among the plural conveyance rollers provided in the inkjet recording apparatus, at least one roller may be a drive roller to which the force generated by a motor (not shown) is transmitted. By rotating the drive roller at a constant rate using the motor, the recording medium is conveyed in a predetermined direction, by a predetermined conveyance amount.

The treatment liquid application unit 12 has treatment liquid jetting head 12S, which is connected to a storage tank in which the treatment liquid is stored. The treatment liquid jetting head 12S jets the treatment liquid from jetting nozzles disposed to face the recording surface of the recording medium so that droplets of the treatment liquid can be applied onto the recording medium. The method used in the treatment liquid application unit 12 is not limited to a method of jetting from a head in the form of a nozzle, and may be a coating method using a coating roller. According to the coating method, the treatment liquid may be readily applied to almost the entire surface of the recording medium, including an image portion on which ink droplets are to be applied by the ink jetting unit 14 provided at the downstream side. In order to uniformize the thickness of the treatment liquid applied onto the recording medium, there may be used an air-knife, or a method of providing a member having an acute angle to provide a gap between the member and the recording medium that corresponds to the predetermined amount of treatment liquid.

The treatment liquid drying zone 13 is positioned at a downstream side of the treatment liquid application unit 12 in the conveyance direction of the recording medium. The treatment liquid drying zone 13 may include a known heating unit such as a heater; an air blowing unit such as a drier; or a combination unit thereof. The heating unit may utilize, for example, a method in which a heat generating member such as a heater is disposed on the side opposite to a recording surface side of the recording medium (for example, below a conveying mechanism on which a recording medium is placed and conveyed in a case of automatically conveying the recording medium); a method in which a warm air or a hot air is applied to the recording surface of the recording medium; or a heating method of using an infrared heater. These methods may be used in a combination of two or more thereof.

Since the surface temperature of the recording medium may vary depending on the type (material, thickness or the like) of the recording medium, the environmental temperature and the like, it is preferable to form an image while regulating the temperature by providing a measurement section that measures the surface temperature of the recording medium and a control mechanism for feeding back the value of the thus-measured surface temperature of the recording medium to the heating control section. The measurement section for measuring the surface temperature of the recording medium is preferably a contact-type or non-contact type thermometer.

The solvent may be removed using a solvent-removing roller or the like. Alternatively, a method in which excess solvent is removed from the recording medium by an air knife is also applicable.

The ink jetting unit 14 is positioned at a downstream side of the treatment liquid drying zone 13 in the conveyance direction of the recording medium. The ink jetting unit 14 includes recording heads (ink jetting heads) 30K, 30C, 30M and 30Y, which are connected to ink reservoirs that store inks of black (K), cyan (C), magenta (M) and yellow (Y), respectively. Each ink reservoir (not shown) stores an ink composition containing a pigment of a corresponding color, resin particles, a water-soluble organic solvent and water, and supplies in accordance with necessity the ink composition to the corresponding head among ink jetting heads 30K, 30C, 30M and 30Y, when image recording is performed. Further, as shown in FIG. 1, recording heads 30A and 30B for jetting inks of specific colors may be further provided, which are positioned at a downstream side of ink jetting heads 30K, 30C, 30M and 30Y in the conveyance direction of the recording medium, such that recording heads 30A and 30B can jet the inks having specific colors in accordance with necessity.

Ink jetting heads 30K, 30C, 30M and 30Y jet inks according to the images to be formed, through jetting nozzles that are positioned so as to face the recording surface of the recording medium. In this way, inks of the respective colors are applied to the recording surface of the recording medium to record a color image.

Treatment liquid jetting head 12S and ink jetting heads 30K, 30C, 30M, 30Y, 30A and 30B are each in the form of full-line head in which a number of jetting ports (nozzles) are aligned along the maximum recording width of the image to be recorded on the recording medium. In this form, image recording on a recording medium can be carried out at higher speed compared to serial-type recording in which recording is carried out using a short shuttle head that reciprocates in the width direction of the recording medium (in a direction on the plane of the recording medium that is perpendicular to the conveyance direction of the recording medium) while performing scanning. In the present invention, either of the serial-type recording method or a recording method capable of recording at relatively high speed, such as a single-path system which is capable of recording by jetting in the main scanning direction in single-path manner where a line is formed at a single round of scanning, may be employed. In the image recording method of the present invention, a high-quality image having high reproducibility may be obtained even in the single-path system.

Here, the treatment liquid jetting head 12S and ink jetting heads 30K, 30C, 30M, 30Y, 30A and 30B each have the same structure.

The application amount of the treatment liquid and the application amount of the ink composition are preferably regulated in accordance with necessity. For example, the amount of the treatment liquid may be changed according to the type of the recording medium, in order to adjust the properties such as viscoelasticity of an aggregate formed when mixing the treatment liquid and the ink composition.

Ink drying zone 15 is positioned at a downstream side of ink jetting unit 14 in the conveyance direction of the recording medium. Ink drying zone 15 may have a structure similar to that of treatment liquid drying zone 13.

The ultraviolet irradiating unit 16 is further disposed at a downstream side of ink drying zone 15 in the conveyance direction of the recording medium. The ultraviolet irradiating unit 16 is configured to irradiate ultraviolet rays by means of ultraviolet irradiating lamp 16S provided in ultraviolet irradiating unit 16 and polymerize and cure monomer components present in an image after drying of the image. The ultraviolet irradiating lamp 16S is configured to irradiate the entire recording surface by means of a lamp disposed to face the recording surface of the recording medium and perform curing of the entire image. Further, the ultraviolet irradiating unit 16 may adopt a halogen lamp, a high-pressure mercury lamp, a laser, an LED, an electron ray irradiating apparatus or the like, in place of the ultraviolet irradiating lamp 16S.

The ultraviolet irradiating unit 16 may be disposed at a downstream or upstream side of the ink drying zone 15, or may be disposed at each of the downstream and upstream sides of the ink drying zone 15.

The inkjet recording apparatus may further include a heating unit at the conveyance path from the feed section to the accumulation section, in order to conduct a heat treatment on the recording medium. For example, by providing a heating unit at a desired position, such as at a upstream side of the treatment liquid drying zone 13 or between ink jetting unit 14 and ink drying zone 15, the temperature of the recording medium can be increased to a desired temperature, so that drying and fixing is performed effectively.

EXAMPLES

Hereinafter, the present invention will be specifically described with reference to Examples. However, the present invention is not limited thereto. Unless otherwise specified, "part(s)" and "%" are all based on mass.

[Production of Initiator Particles 1]

To 3 g of IRGACURE 907 (trade name, manufactured by BASF) as a water-insoluble polymerization initiator was added 40 g of ethyl acetate, followed by dissolution with stirring. The resulting solution was then added to 38 g of an aqueous solution in which 1 g of a water-soluble polymer NEWPOLE PE-108 (trade name, manufactured by Sanyo Chemical Industries, Ltd.) had been dissolved, followed by 5 repetitions of 4-minute stirring at 10,000 rpm and 1-minute standing using a stirring apparatus CLEARMIX (trade name, manufactured by M Technique Co., Ltd.) and addition of 12 g of water. Thereafter, nitrogen flow was carried out at 25° C. for one hour to remove the solvent, thereby obtaining an emulsion of initiator particles 1.

The volume average particle diameter of the resulting initiator particles was 200 nm, as measured by using a NANOTRACK particle size distribution measuring apparatus UPA-EX150 (trade name, manufactured by Nikkiso Co., Ltd.).

[Production of Initiator Particles 2 to 16]

Initiator particles 2 to 16 were produced in the same manner as in the production of the initiator particles 1, except that kinds of initiator and water-soluble polymer were changed to those given in Table 1.

In Table 1, IRUGACURE 184, IRUGACURE 819, IRUGACURE 369, IRUGACURE 127, TPO, and ITX (all trade names) are water-insoluble polymerization initiators manufactured by BASF, and DETX-S (trade name) is a water-insoluble polymerization initiator manufactured by Nippon Kayaku Co., Ltd.

NEWPOLE PE-107, PE-64, PE-68, and PE-128 (all trade names) are water-soluble polymers (PPO-PEO block copolymers) manufactured by Sanyo Chemical Industries, Ltd., UNILUBE 70DP-950B and 75DE-2620R (all trade names) are water-soluble polymers (PPO-PEO block copolymers) manufactured by NOF Corporation, and PVPK25 (trade name) is polyvinyl pyrrolidone (a weight average molecular weight of 25,000) which is a water-soluble polymer.

[Production of Initiator Particles C1 to C3]

Initiator particles C1 to C3 were produced by controlling a particle diameter, in a manner that a water-soluble polymer was not used in the production of initiator particles 1 or initiator particles 5, and stirring was carried out under conditions: a stirring speed of 5000 rpm, and a stirring time of 5 minutes, and the number of repetitions of 1 or 2.

TABLE 1

| Initiator particles | Water-insoluble polymerization initiator | Water-soluble polymer | Volume average particle diameter (nm) |
|---|---|---|---|
| Initiator particles 1 | IRGACURE 907 | NEWPOLE PE-108 | 200 |
| Initiator particles 2 | IRGACURE 184 | NEWPOLE PE-108 | 180 |
| Initiator particles 3 | IRGACURE 819 | NEWPOLE PE-108 | 190 |
| Initiator particles 4 | IRGACURE 369 | NEWPOLE PE-108 | 180 |
| Initiator particles 5 | IRGACURE 127 | NEWPOLE PE-108 | 200 |

TABLE 1-continued

| Initiator particles | Water-insoluble polymerization initiator | Water-soluble polymer | Volume average particle diameter (nm) |
|---|---|---|---|
| Initiator particles 6 | TPO | NEWPOLE PE-108 | 210 |
| Initiator particles 7 | DETX-S | NEWPOLE PE-108 | 180 |
| Initiator particles 8 | Benzophenone | NEWPOLE PE-108 | 200 |
| Initiator particles 9 | ITX | NEWPOLE PE-108 | 200 |
| Initiator particles 10 | IRGACURE 907 | NEWPOLE PE-64 | 160 |
| Initiator particles 11 | IRGACURE 907 | NEWPOLE PE-68 | 170 |
| Initiator particles 12 | IRGACURE 907 | NEWPOLE PE-78 | 180 |
| Initiator particles 13 | IRGACURE 907 | NEWPOLE PE-128 | 220 |
| Initiator particles 14 | IRGACURE 907 | UNILUBE 70DP-950B | 200 |
| Initiator particles 15 | IRGACURE 907 | UNILUBE 75DE-2620R | 200 |
| Initiator particles 16 | IRGACURE 127 | PVPK25 | 480 |
| Initiator particles 17 | IRGACURE 907 | PVPK25 | 250 |
| Initiator particles C1 | IRGACURE 907 | — | 3000 |
| Initiator particles C2 | IRGACURE 907 | — | 1500 |
| Initiator particles C3 | IRGACURE 127 | — | 520 |

[Synthesis of Polymer Dispersant P-1]

To a 1000 ml three-necked flask having a stirrer and a condenser tube was added 88 g of methyl ethyl ketone, and then the flask was heated at 72° C. under a nitrogen atmosphere. A solution in which 0.85 g of dimethyl-2,2'-azobisisobutyrate, 60 g of benzyl methacrylate, 10 g of methacrylic acid, and 30 g of methyl methacrylate were dissolved in 50 g of methyl ethyl ketone was added dropwise thereto over 3 hours. After the completion of dropwise addition, the content in the flask was allowed to further react for one hour. Thereafter, a solution in which 0.42 g of dimethyl-2,2'-azobisisobutyrate was dissolved in 2 g of methyl ethyl ketone was added thereto, and the temperature was raised to 78° C. and heating was carried out for 4 hours. The obtained reaction solution was re-precipitated twice in a large excess amount of hexane, and the precipitated resin was dried to obtain 96 g of polymer dispersant P-1.

The composition of the obtained resin was confirmed by $^1$H-NMR and the weight average molecular weight (Mw) determined by GPC was 44,600. The acid value, as determined by a method described in JIS Standard (JIS K0070: 1992), was 65.2 mgKOH/g.

[Production of Resin-Coated Pigment]

(Production of Resin-Coated Cyan Pigment Dispersion C)

10 parts of pigment blue 15:3 (trade name: PHTHALOCYANINE BLUE A220, manufactured by Dainichiseika Color & Chemicals Mfg. Co., Ltd.), 5 parts of the polymer dispersant P-1, 42 parts of methyl ethyl ketone, 5.5 parts of 1 mol/L aqueous NaOH solution, and 87.2 parts of ion exchange water were mixed, and dispersed using 0.1 mmφ zirconia beads in a bead mill for 2 hours to 6 hours.

Methyl ethyl ketone was removed from the obtained dispersion at 55° C. under a reduced pressure and some water was further removed, thereby obtaining a resin-coated cyan pigment dispersion C (coloring particles) having a pigment concentration of 10.2% by mass.

—Resin-Coated Magenta Pigment Dispersion M—

A resin-coated magenta pigment dispersion M (coloring particles) was obtained in the same manner as in the production of the resin-coated cyan pigment dispersion, except that CHROMOPHTHAL JET MAGENTA DMQ (trade name, manufactured by BASF, pigment red 122) was used in place of PHTHALOCYANINE BLUE A220.

—Resin-Coated Yellow Pigment Dispersion Y—

A resin-coated yellow pigment dispersion Y (coloring particles) was obtained in the same manner as in the production of the resin-coated cyan pigment dispersion, except that IRGALITE YELLOW GS (trade name, manufactured by BASF, pigment yellow 74) was used in place of PHTHALOCYANINE BLUE A220.

—Resin-Coated Black Pigment Dispersion K—

A resin-coated black pigment dispersion K (coloring particles) was obtained in the same manner as in the production of the resin-coated cyan pigment dispersion, except that pigment dispersion CAB-O-JET™ 200 (carbon black, manufactured by Cabot Corporation) was used in place of PHTHALOCYANINE BLUE A220.

Example 1

Production of Ink Set 1

Ink compositions composed of cyan ink C-1, magenta ink M-1, yellow ink Y-1, and black ink K-1, and a treatment liquid 1 were respectively produced according to the following procedure, and an ink set 1 composed of cyan ink C-1, magenta ink M-1, yellow ink Y-1, black ink K-1, and the treatment liquid 1 was produced.

(Production of Cyan Ink C-1)

Using the resin-coated cyan pigment dispersion (C), a cyan ink C-1 (ink composition) was produced by mixing the resin-coated cyan pigment dispersion (C), a water-soluble organic solvent, ion exchange water, a polymerization initiator, a polymerizable compound, and a surfactant in the following composition, and then filtering the mixture through a 5 μm membrane filter.

—Composition of Cyan Ink C-1—

Resin-coated cyan pigment dispersion (C) (solid concentration): 6%

Initiator particles 1 (initiator concentration): 3% (trade name: IRGACURE 907, manufactured by BASF, trade name: PE-108, manufactured by Sanyo Chemical Industries, Ltd.)

Polymerizable compound: 20%
(trade name: NKESTER A-400, manufactured by Shin-Nakamura Chemical Co., Ltd.)

OLFINE E1010:1%
(trade name, manufactured by Nissin Chemical Industry Co., Ltd.; surfactant)

Ion exchange water: added to make a total of 100%.

A pH (25° C.) of cyan pigment ink C-1, as measured by a pH meter WM-50 EG (trade name, manufactured by DKK-TOA Corporation), was 8.5.

(Production of Magenta Ink M-1)

A magenta ink M-1 (ink composition) was produced in the same manner as in the production of the cyan ink C-1, except that the resin-coated magenta pigment dispersion M was used in place of the resin-coated cyan pigment dispersion C. The pH value of the product was 8.5.

(Production of Yellow Ink Y-1)

A yellow ink Y-1 (ink composition) was produced in the same manner as in the production of the cyan ink C-1, except that the resin-coated yellow pigment dispersion Y was used in place of the resin-coated cyan pigment dispersion C. The pH value of the product was 8.5.

(Production of Black Ink K-1)

A black ink K-1 (ink composition) was produced in the same manner as in the production of the cyan ink C-1, except that the resin-coated black pigment dispersion K was used in place of the resin-coated cyan pigment dispersion C. The pH value of the product was 8.5.

(Production of Treatment Liquid 1)

The following materials were mixed to produce a treatment liquid 1. A pH (25° C.) of treatment liquid 1, as measured by a pH meter WM-50 EG (trade name, manufactured by DKK-TOA Corporation), was 1.0.

Malonic acid (manufactured by Tateyama Kasei Co., Ltd.; acidic compound): 25%
Tripropylene glycol monomethyl ether: 5%
(water-soluble organic solvent)
Ion exchange water: 70%

Examples 2 to 28

Ink sets 2 to 28 were produced in the same manner as in the production of the ink set 1 in Example 1, except that initiator particles and polymerizable compounds in the production of the individual ink compositions were changed to those given in Table 2 below.

In addition, the following polymerizable compound 1, polymerizable compound 2 and polymerizable compound 12 were used.

Comparative Examples 1 to 4

Ink sets C1 to C4 were produced in the same manner as in the production of the ink set 1 in Example 1, except that initiator particles and polymerizable compounds in the production of the individual ink compositions were changed to those given in Table 2 below.

NKESTER A-400 (trade name) is a water-soluble polymerizable compound manufactured by Shin-Nakamura Chemical Co., Ltd. As Monomer A, triethylene glycol dimethacrylate (manufactured by Shin-Nakamura Chemical Co., Ltd.) which is a water-insoluble polymerizable compound was used.

(Production of Treatment Liquid 2)

The following materials were mixed to produce a treatment liquid 2. The pH (25° C.) of treatment liquid 2 after pH adjusting, as measured by a pH meter WM-50 EG (trade name, manufactured by DKK-TOA Corporation), was 4.0.

Polyethylene imine: 13%
(cationic polymer, a weight average molecular weight of 1800)
Ion exchange water: 87%

(Production of Treatment Liquid 3)

The following materials were mixed to produce a treatment liquid 3. The pH (25° C.) of treatment liquid 3, as measured by a pH meter WM-50 EG (trade name, manufactured by DKK-TOA Corporation), was 4.0.

Magnesium nitrate: 15%
Diethylene glycol monoethyl ether: 4%
(manufactured by Wako Pure Chemical Industries, Ltd.)
Surfactant A (10%, the structure below): 1%
Ion exchange water: 80%

The structure of surfactant A used in the treatment liquid is as follows.

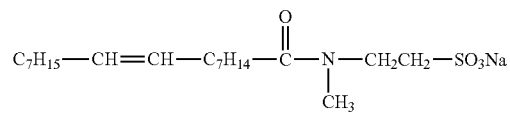

Surfactant A

[Ink Stability Evaluation]

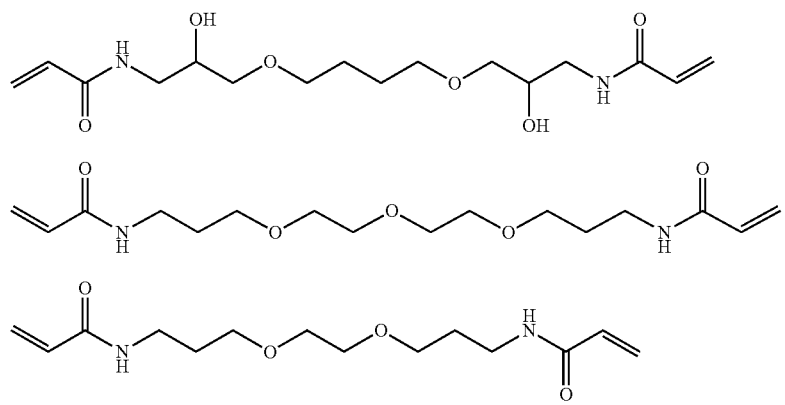

Polymerizable compound 1

Polymerizable compound 2

Polymerizable compound 12

For the ink compositions (cyan inks C-1 to C-27, magenta inks M-1 to M-27, yellow inks Y-1 to Y-27, black inks K-1 to K-27) produced as above, ink stability was evaluated in the following manner.

The ink compositions were adjusted to a temperature of 25° C. Then, using a vibration type viscometer (trade name: DV-II+VISCOMETER, manufactured by BROOKFIELD) at 25° C. and relative humidity of 50%, each ink composition in the form of an undiluted solution was measured by means of a cone plate (435 mm) at 25° C. An average value of data at 20% to 90% torque and 0.5 rpm to 100 rpm was taken as a measurement value. The measurement value immediately after production was taken to be ink viscosity 1.

Then, portions of the ink compositions were taken in sample bottles made of glass, and allowed to stand in a hermetically capped state at 60° C. for 2 weeks. Then, post-storage ink viscosity 2 was measured in the same manner as above. At the same time, states of the ink compositions were visually investigated.

The change rate of ink viscosity measured before and after storage {100−(ink viscosity 2/ink viscosity 1)×100} was calculated. In addition to the visual inspection results after storage, the evaluation of ink storability was carried out according to the following evaluation criteria.

—Evaluation Criteria—

A: change rate of ink viscosity<±15%, and changes in ink composition not recognized.

B: ±15%<change rate of ink viscosity<±30%, and changes in ink composition not recognized.

C: ±30%<change rate of ink viscosity<±50%, and changes in ink composition not recognized.

D: ±50%<change rate of ink viscosity, or segregation or gelation of ink composition observed.

[Image Formation and Curing Sensitivity Evaluation]

As shown in FIG. 1, an inkjet apparatus was prepared including treatment liquid application unit 12, having treatment liquid jetting head 12S that jets an aqueous treatment liquid; treatment liquid drying zone 13 that dries the applied aqueous treatment liquid; ink jetting unit 14 that jets various aqueous inks; ink drying zone 15 at which the jetted aqueous ink is dried; and ultraviolet irradiating unit 16 having ultraviolet irradiating lamp 16S that is capable of irradiating ultraviolet rays (UV) in this order in the conveyance direction of the recording medium (the direction of the arrow shown in the figure).

Using OK TOPCOAT+(trade name, grammage of 104.7 g/m$^2$) as a recording medium, an image was formed according to the following procedure. The formed image was evaluated as follows. The results are given in Table 2.

Using ink set 1 composed of cyan ink C-1, magenta ink M-1, yellow ink Y-1 and black ink K-1 and treatment liquid 1, a line image and a solid image were formed by 4 color single-pass recording.

At this time, a line image was formed by jetting lines of 1-dot width, lines of 2-dot width and lines of 4-dot width at 1200 dpi in the main scanning direction by single pass.

The solid image was formed by jetting an ink composition over the entire surface of a sample which was prepared by cutting a recording medium to A5 size. General conditions when performing recording are as follows.

(1) Treatment Liquid Applying Step

A treatment liquid was applied in an amount of 1.4 g/m$^2$ to the entire surface of a recording medium by an anilox roller (number of lines: 100 to 300/inch) in a roll coater whose application amount is controlled.

(2) Treatment Step

Next, the recording medium onto which the treatment liquid was applied was subjected to drying and penetration treatments under the following conditions.

Air velocity: 10 m/s

Temperature: heating was performed from the side opposite to the recording surface side of the recording medium (rear surface side) using a contact type plane heater, such that the surface temperature of the recording surface side of the recording medium became 60° C.

(3) Ink Applying Step

Next, the ink composition was jetted by an inkjet method to the treatment liquid-applied surface of the recording medium under the following conditions, and line images and solid images were respectively formed.

Head: Piezo full line heads of 1,200 dpi/20 inch width were arranged for 4 colors Droplet jetting amount: 2.0 pl Operating frequency: 30 kHz (4) Ink Drying Step Next, the ink composition-applied recording medium was dried under the following conditions.

Drying method: drying by air blowing

Air velocity: 15 m/s

Temperature: heating was performed from the side opposite to the recording surface side of the recording medium (rear surface side) using a contact type plane heater, such that the surface temperature of the recording surface side of the recording medium became 60° C.

(5) UV Exposure Step

After drying of the image, the image was cured by irradiating UV light (metal halide lamp manufactured by EYE GRAPHICS CO., LTD., maximum irradiation wavelength: 365 nm) at the integral irradiation dose of 3 J/cm$^2$ in UV irradiating unit 16.

(Curing Sensitivity Evaluation)

Non-printed OK TOPCOAT+(trade name) was wound on a paperweight (weight: 470 g, size: 15 mm×30 mm×120 mm) (contact area between non-printed OK TOPCOAT+ and evaluation sample: 150 mm$^2$), and the printed surface of an evaluation sample on which the solid image had been formed was rubbed using the Non-printed OK TOPCOAT+ in a reciprocating motion three times (corresponding to a load of 260 kg/m$^2$). The post-rubbing printed surface was visually observed and evaluated according to the following evaluation criteria. The evaluation results are given in Table 2.

—Evaluation Criteria—

A: Peeling of image (coloring material) was not recognized on printed surface.

B: Slight peeling of image (coloring material) was recognized on printed surface.

C: Peeling of image (coloring material) was recognized on printed surface, which was at a problematic level in practical use.

D: Noticeable peeling of image (coloring material) was recognized on printed surface.

Then, ink sets 2 to 27 were also subjected to image formation in the same manner as above, and curing sensitivity was evaluated. The evaluation results are given in Table 2.

[Jetting Property Evaluation]

For the ink compositions produced as above, jetting properties were evaluated in the following manner. The evaluation results are given in Table 2.

Using GELJET GX5000 Printer Head (trade name, manufactured by Ricoh Japan Co., Ltd.), 96 lines were printed with a length of 10 cm at the ink droplet amount of 3.5 pl, the jetting frequency of 24 kHz, and nozzle arranging direction× conveying direction of 75 dpi×1200 dpi. As a recording medium, a GASAI Photo Finish Pro (trade name, manufactured by Fujifilm Corporation) was used. Immediately after printing, the image was dried at 60° C. for 3 seconds and exposed with a UV lamp at an exposure dose of 2.5 J/cm$^2$ to perform a fixation treatment, thereby obtaining a printed sample.

Distances between 96 lines at a site which was 5 cm from a droplet jetting initiation part of the resulting printed sample were measured with a dot analyzer DA-6000 (trade name, manufactured by Oji Scientific Instruments), a standard deviation thereof was calculated, and the jetting positional accuracy (initial jetting property) was evaluated according to the following evaluation criteria.

Evaluation Criteria

A: 3 μm or more but less than 4 μm

B: 4 μm or more but less than 5 μm

C: 5 μm or more but less than 6 μm

D: 6 μm or more

TABLE 2

| | No. | Initiator particles Water-insoluble polymerization initiator | Water-soluble polymer | Volume average particle diameter (nm) | Polymerizable compound | Ink stability | Curing sensitivity | Jetting property |
|---|---|---|---|---|---|---|---|---|
| Example 1 | 1 | IRGACURE 907 | PE-108 | 200 | NK ESTER A-400 | B | A | B |
| Example 2 | 2 | IRGACURE 184 | PE-108 | 180 | NK ESTER A-400 | B | B | B |
| Example 3 | 3 | IRGACURE 819 | PE-108 | 190 | NK ESTER A-400 | B | A | B |
| Example 4 | 4 | IRGACURE 369 | PE-108 | 180 | NK ESTER A-400 | B | B | B |
| Example 5 | 5 | IRGACURE 127 | PE-108 | 300 | NK ESTER A-400 | B | B | B |
| Example 6 | 6 | TPO | PE-108 | 210 | NK ESTER A-400 | B | A | B |
| Example 7 | 7 | DETX-S | PE-108 | 180 | NK ESTER A-400 | B | B | B |
| Example 8 | 8 | Benzophenone | PE-108 | 200 | NK ESTER A-400 | B | B | B |
| Example 9 | 9 | ITX | PE-108 | 200 | NK ESTER A-400 | B | B | B |
| Example 10 | 1 | IRGACURE 907 | PE-108 | 200 | Polymerizable compound 1 | A | A | A |
| Example 11 | 1 | IRGACURE 907 | PE-108 | 200 | Polymerizable compound 2 | B | A | A |
| Example 12 | 1 | IRGACURE 907 | PE-108 | 200 | Polymerizable compound 12 | B | A | A |
| Example 13 | 10 | IRGACURE 907 | PE-64 | 160 | Polymerizable compound 1 | A | A | A |
| Example 14 | 11 | IRGACURE 907 | PE-68 | 170 | Polymerizable compound 1 | A | A | A |
| Example 15 | 12 | IRGACURE 907 | PE-78 | 180 | Polymerizable compound 1 | A | A | A |
| Example 16 | 13 | IRGACURE 907 | PE-128 | 220 | Polymerizable compound 1 | A | A | A |
| Example 17 | 14 | IRGACURE 907 | 70DP-950B | 200 | Polymerizable compound 1 | A | A | A |
| Example 18 | 15 | IRGACURE 907 | 75DE-2620R | 200 | Polymerizable compound 1 | A | A | A |
| Example 19 | 16 | IRGACURE 127 | PKPK25 | 480 | Polymerizable compound 1 | B | B | B |
| Example 20 | 2 | IRGACURE 184 | PE-108 | 180 | Polymerizable compound 1 | B | B | B |
| Example 21 | 3 | IRGACURE 819 | PE-108 | 190 | Polymerizable compound 1 | A | A | A |
| Example 22 | 4 | IRGACURE 369 | PE-108 | 180 | Polymerizable compound 1 | B | B | B |
| Example 23 | 5 | IRGACURE 127 | PE-108 | 300 | Polymerizable compound 1 | B | B | B |
| Example 24 | 6 | TPO | PE-108 | 210 | Polymerizable compound 1 | A | A | A |
| Example 25 | 7 | DETX-S | PE-108 | 180 | Polymerizable compound 1 | B | B | B |
| Example 26 | 8 | Benzophenone | PE-108 | 200 | Polymerizable compound 1 | B | B | B |
| Example 27 | 9 | ITX | PE-108 | 200 | Polymerizable compound 1 | B | B | B |
| Example 28 | 17 | IRGACURE 907 | PKPK25 | 250 | Polymerizable compound 1 | A | A | C |
| Comparative Example11 | C1 | IRGACURE 907 | — | 3000 | NK ESTER A-400 | D | C | D |
| Comparative Example12 | C2 | IRGACURE 907 | — | 1500 | Monomer A | D | C | D |
| Comparative Example13 | C3 | IRGACURE 127 | — | 520 | NK ESTER A-400 | C | C | C |
| Comparative Example14 | 1 | IRGACURE 907 | PE-108 | 200 | Monomer A | C | C | C |

As shown in Table 2, it was confirmed that all of the ink compositions of the present invention have excellent jetting property, ink stability and curing sensitivity.

Further, even when the same evaluation was carried out using the treatment liquid 2 or treatment liquid 3 in place of the treatment liquid 1 in the above Examples, excellent curing sensitivity was confirmed.

Japanese Patent Application No. 2010-079614 is incorporated herein by reference.

All publications, patent applications, and technical standards mentioned in this specification are herein incorporated by reference to the same extent as if each individual publication, patent application, or technical standard was specifically and individually indicated to be incorporated by reference.

The invention claimed is:

1. An ink composition comprising:
    initiator particles comprising a water-insoluble polymerization initiator and a water-soluble polymer and having a volume average particle diameter of 500 nm or less;
    a water-soluble polymerizable compound;
    a pigment; and
    water.

2. The ink composition according to claim 1, wherein the initiator particles are obtained by mixing an organic solvent solution containing the water-insoluble polymerization initiator with an aqueous solution containing the water-soluble polymer.

3. The ink composition according to claim 1, wherein the pigment is a water-dispersible pigment wherein at least a portion of the surface of the pigment is coated with a water-insoluble polymer.

4. The ink composition according to claim 1, wherein the water-soluble polymer is a nonionic water-soluble polymer.

5. The ink composition according to claim 4, wherein the nonionic water-soluble polymer is a block copolymer having a polyoxyethylene structure and a polyoxypropylene structure.

6. The ink composition according to claim 5, wherein the initiator particles are obtained by mixing an organic solvent solution containing the water-insoluble polymerization initiator with an aqueous solution containing the water-soluble polymer.

7. The ink composition according to claim 6, wherein the pigment is a water-dispersible pigment wherein at least a portion of the surface of the pigment is coated with a water-insoluble polymer.

8. An ink set comprising the ink composition of claim 7 and a treatment liquid that is capable of forming an aggregate by contact with the ink composition.

9. The ink set according to claim 8, wherein the treatment liquid includes at least one selected from the group consisting of an acidic compound, a polyvalent metal salt, and a cationic polymer.

10. An ink set comprising the ink composition of claim 1 and a treatment liquid that is capable of forming an aggregate by contact with the ink composition.

11. The ink set according to claim 10, wherein the treatment liquid includes at least one selected from the group consisting of an acidic compound, a polyvalent metal salt, and a cationic polymer.

12. An image forming method comprising:
applying the ink composition of claim 1 onto a recording medium by an inkjet method to form an image; and
applying a treatment liquid that is capable of forming an aggregate by contact with the ink composition onto the recording medium.

13. The image forming method according to claim 12, further comprising irradiating active energy rays to the ink composition applied onto the recording medium.

14. The image forming method according to claim 12, wherein the recording medium is a coated paper.

15. The image forming method according to claim 12, wherein the ink composition is applied onto the recording medium onto which the treatment liquid has been applied.

16. A method for producing an ink composition, comprising:
mixing an organic solvent solution containing a water-insoluble polymerization initiator with an aqueous solution containing a water-soluble polymer to obtain initiator particles containing the water-insoluble polymerization initiator and the water-soluble polymer and having a volume average particle diameter of 500 nm or less; and
mixing the initiator particles, a water-soluble polymerizable compound, a pigment, and water to obtain an ink composition.

* * * * *